United States Patent
Huang et al.

(10) Patent No.: US 11,641,252 B1
(45) Date of Patent: May 2, 2023

(54) DIFFERENTIAL BASED DECODING FOR A NON-COHERENT SIGNAL

(71) Applicant: QUALCOMM Incorporated, San Diego, CA (US)

(72) Inventors: Jiun-Ting Huang, San Diego, CA (US); Wei Yang, San Diego, CA (US); Jay Kumar Sundararajan, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/653,604

(22) Filed: Mar. 4, 2022

(51) Int. Cl.
*H04L 1/00* (2006.01)
*H04L 27/26* (2006.01)

(52) U.S. Cl.
CPC .......... *H04L 1/0045* (2013.01); *H04L 1/0057* (2013.01); *H04L 27/265* (2013.01)

(58) Field of Classification Search
CPC .... H04L 1/0045; H04L 1/0057; H04L 27/265
See application file for complete search history.

(56) References Cited

U.S. PATENT DOCUMENTS

| | | | |
|---|---|---|---|
| 2008/0316910 A1 | 12/2008 | Ashikhmin | |
| 2009/0066545 A1 | 3/2009 | Kim | |
| 2011/0122846 A1* | 5/2011 | Yu | H04J 13/16 370/335 |
| 2017/0026057 A1* | 1/2017 | Goettfert | H03M 13/136 |
| 2021/0099188 A1* | 4/2021 | Ghaddar | H03M 13/6572 |
| 2021/0184697 A1 | 6/2021 | Yang et al. | |

FOREIGN PATENT DOCUMENTS

WO 2012027819 A1 3/2012

OTHER PUBLICATIONS

Intel Corporation: "On Potential Techniques for PUCCH Coverage Enhancement," 3GPP Draft, 3GPP TSG RAN WG1 #103-e, 3rd Generation Partnership Project (3GPP), Mobile Competence Centre, 650, Route Des Lucioles, F-06921, Sophia-Antipolis Cedex, France, vol. RAN WG1. No. e-Meeting, Oct. 26, 2020-Nov. 13, 2020, Nov. 11, 2020 (Nov. 11, 2020), XP051953502, pp. 1-13, URL: https://ftp.3gpp.org/tsg_ran/WG1_RL1/TSGR1_103-e/Docs/R1-2009602. zip R1-2009602 Intel CovEnh_PUCCH—Update of 2007955.docx—[retrieved on Nov. 11, 2020] Section 2.

(Continued)

*Primary Examiner* — Sung S Ahn
(74) *Attorney, Agent, or Firm* — Procopio, Cory, Hargreaves & Savitch LLP

(57) ABSTRACT

A method, a computer-readable medium, and an apparatus are provided for wireless communication at a receiver. The apparatus is configured to receive a non- coherent signal and determine a first differential of the received non-coherent signal on each of one or more receive antennas for a set of binary vectors to obtain a lower order representation of the non-coherent signal. The apparatus is configured to combine the differentials across antennas, decode the lower order representation of the non-coherent signal based on the first differential of the non-coherent signal and to reconstruct a higher order representation of the non-coherent signal based on the decoded lower order representation of the non-coherent signal.

30 Claims, 17 Drawing Sheets

(56) References Cited

OTHER PUBLICATIONS

NEC: "Discussion on PUCCH Coverage Enhancement," 3GPP Draft, 3GPP TSG RAN WG1 #103-e, R1-2008079, 3rd Generation Partnership Project (3GPP), Mobile Competence Centre, 650, Route Des Lucioles, F-06921, Sophia-Antipolis Cedex, France, vol. RAN WG1. No. e-Meeting, Oct. 26, 2020-Nov. 13, 2020, Oct. 16, 2020 (Oct. 16, 2020), XP051939456, 3 pages, URL: https://ftp.3gpp.org/tsg_ran/WG1_RL1/TSGR1_103-e/Docs/R1-2008079.zip R1-2008079 Discussion on PUCCH coverage enhancement.docx [retrieved on Oct. 16, 2020] Section 2.2.

Ashikhmin A., et al., "Space Time Reed Muller Codes for Noncoherent MIMO Transmission", IEEE, Sep. 2005, pp. 1 to 5, (Year:2005).

Zhang H., et al., "Reed-Muller Sequence for 5G Grant-Free Massive Access", IEEE, Dec. 12, 2017, pp. 1 to 7, (Year:2007).

\* cited by examiner

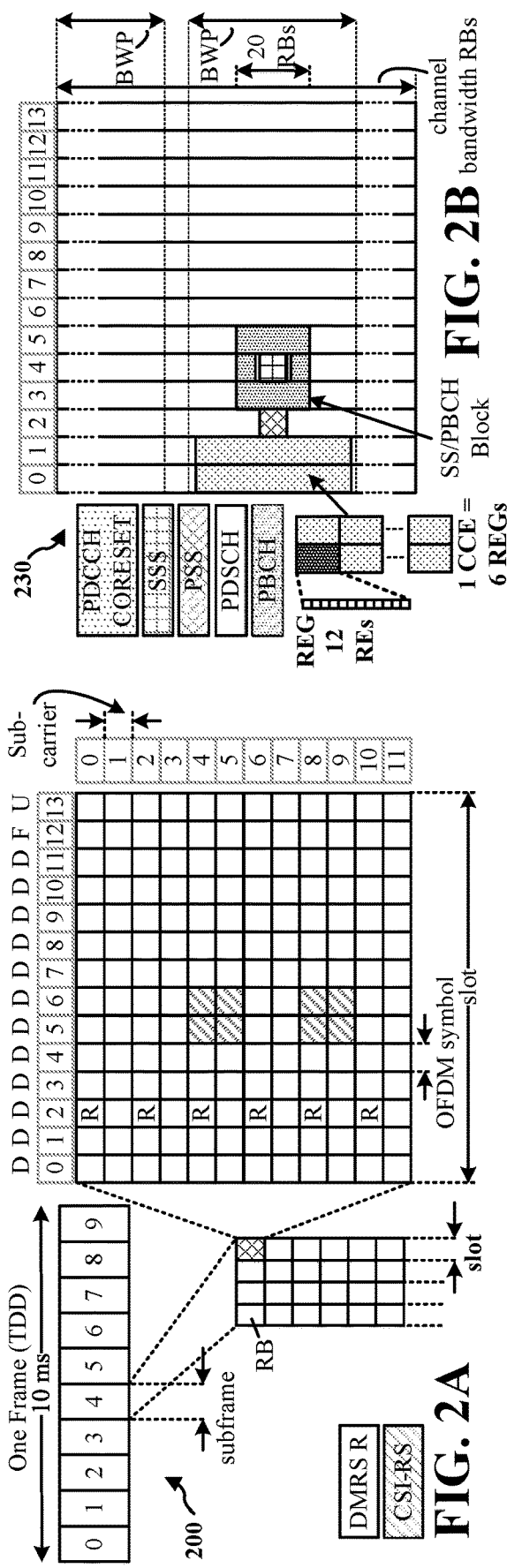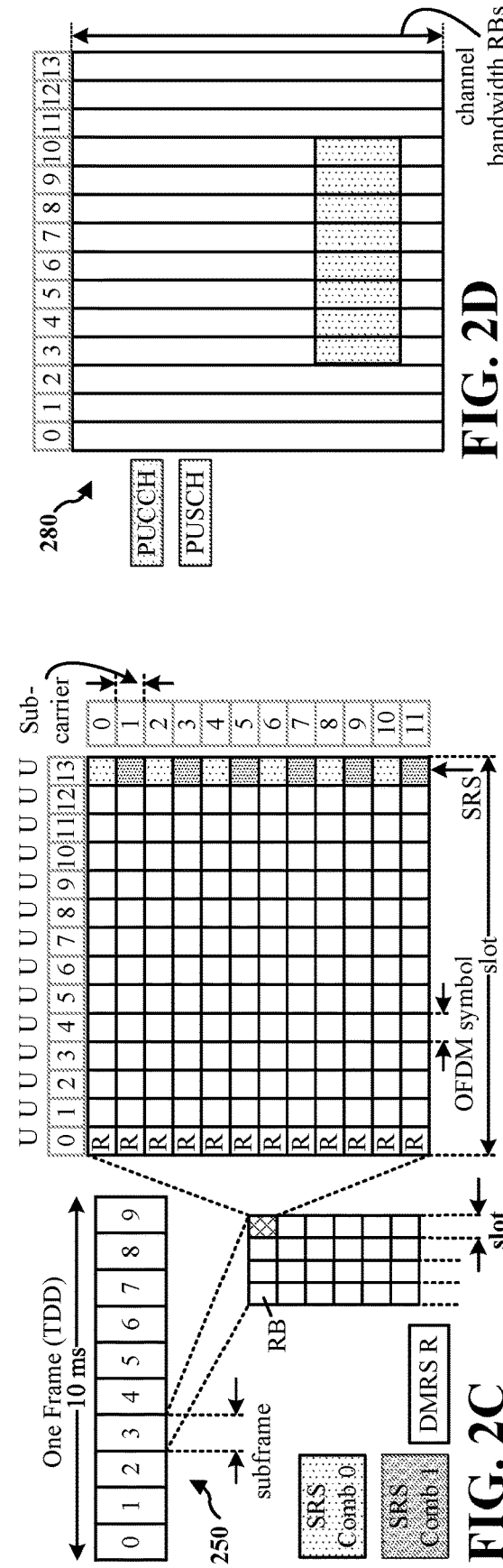

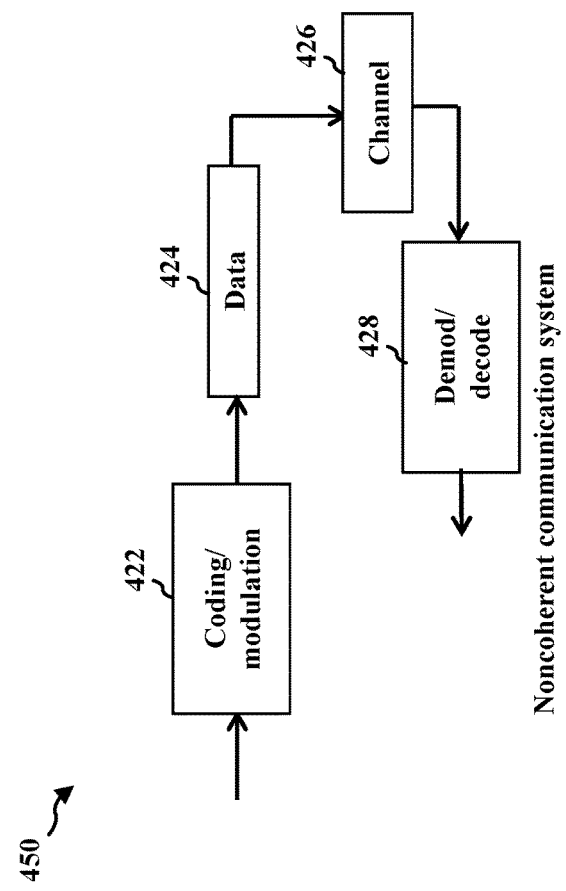
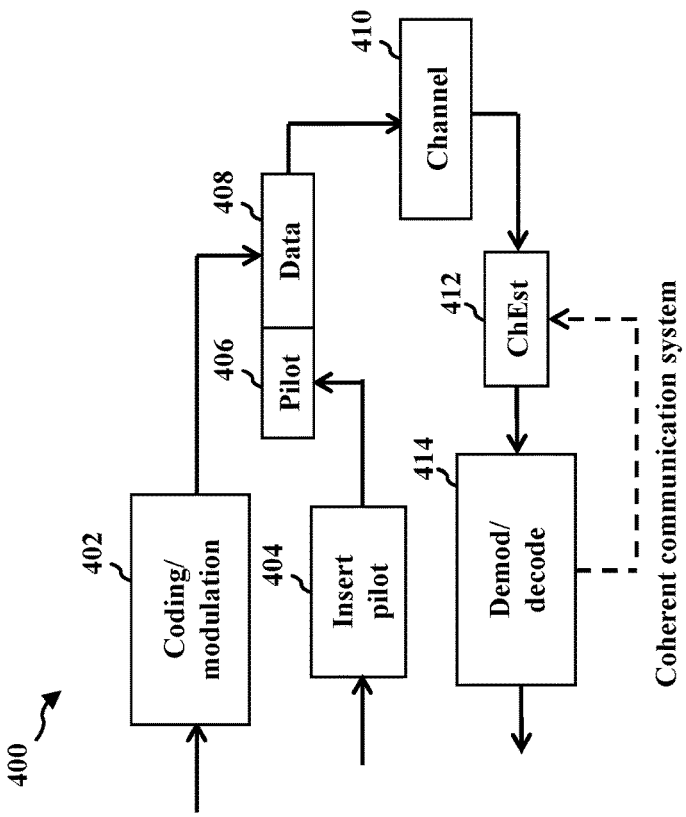
FIG. 4B
FIG. 4A

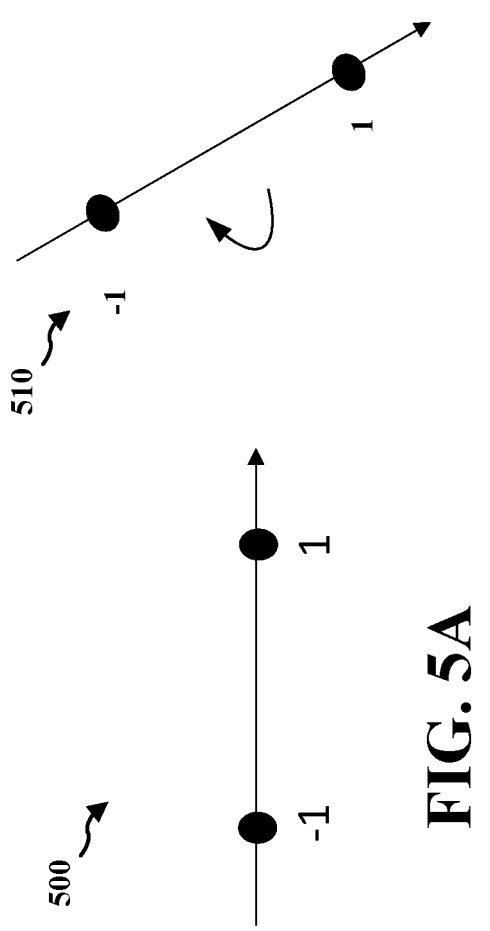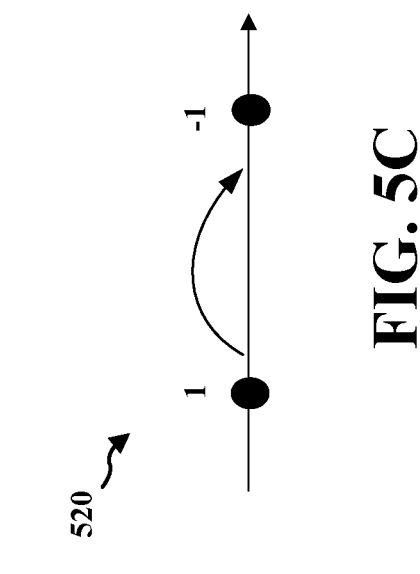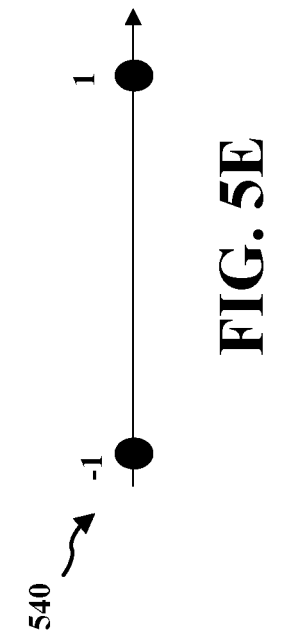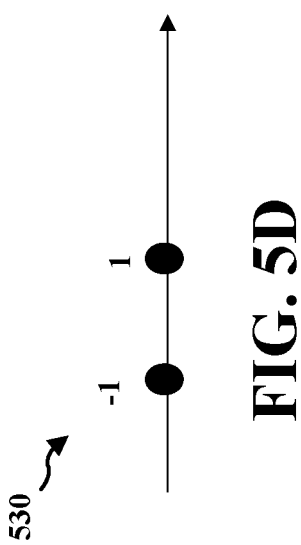
FIG. 5A
FIG. 5B
FIG. 5C
FIG. 5D
FIG. 5E

FIG. 8 Modified second order RM code, RM(2,m)

DIFFERENTIAL BASED DECODING FOR A NON-COHERENT SIGNAL

TECHNICAL FIELD

The present disclosure relates generally to communication systems, and more particularly, to wireless communication including decoding a non-coherent signal.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5 G New Radio (NR). 5 G NR is part of a continuous mobile broadband evolution promulgated by Third Generation Partnership Project (3 GPP) to meet new requirements associated with latency, reliability, security, scalability (e.g., with Internet of Things (IoT)), and other requirements. 5 G NR includes services associated with enhanced mobile broadband (eMBB), massive machine type communications (mMTC), and ultra-reliable low latency communications (URLLC). Some aspects of 5 G NR may be based on the 4 G Long Term Evolution (LTE) standard. There exists a need for further improvements in 5 G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a receiver. The apparatus is configured to receive a non-coherent signal and determine a first differential of the received non-coherent signal on each of one or more receive antennas for a set of binary vectors to obtain a lower order representation of the non-coherent signal. The apparatus is configured to combine the differentials across antennas, decode the lower order representation of the non-coherent signal based on the first differential of the non-coherent signal and to reconstruct a higher order representation of the non-coherent signal based on the decoded lower order representation of the non-coherent signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 4A illustrates a coherent communication system.

FIG. 4B illustrates a non-coherent communication system, in accordance with various aspects of the present disclosure.

FIGS. 5A-5E illustrate example aspects of phase of a channel, in accordance with various aspects of the present disclosure.

DETAILED DESCRIPTION

Figure 1:
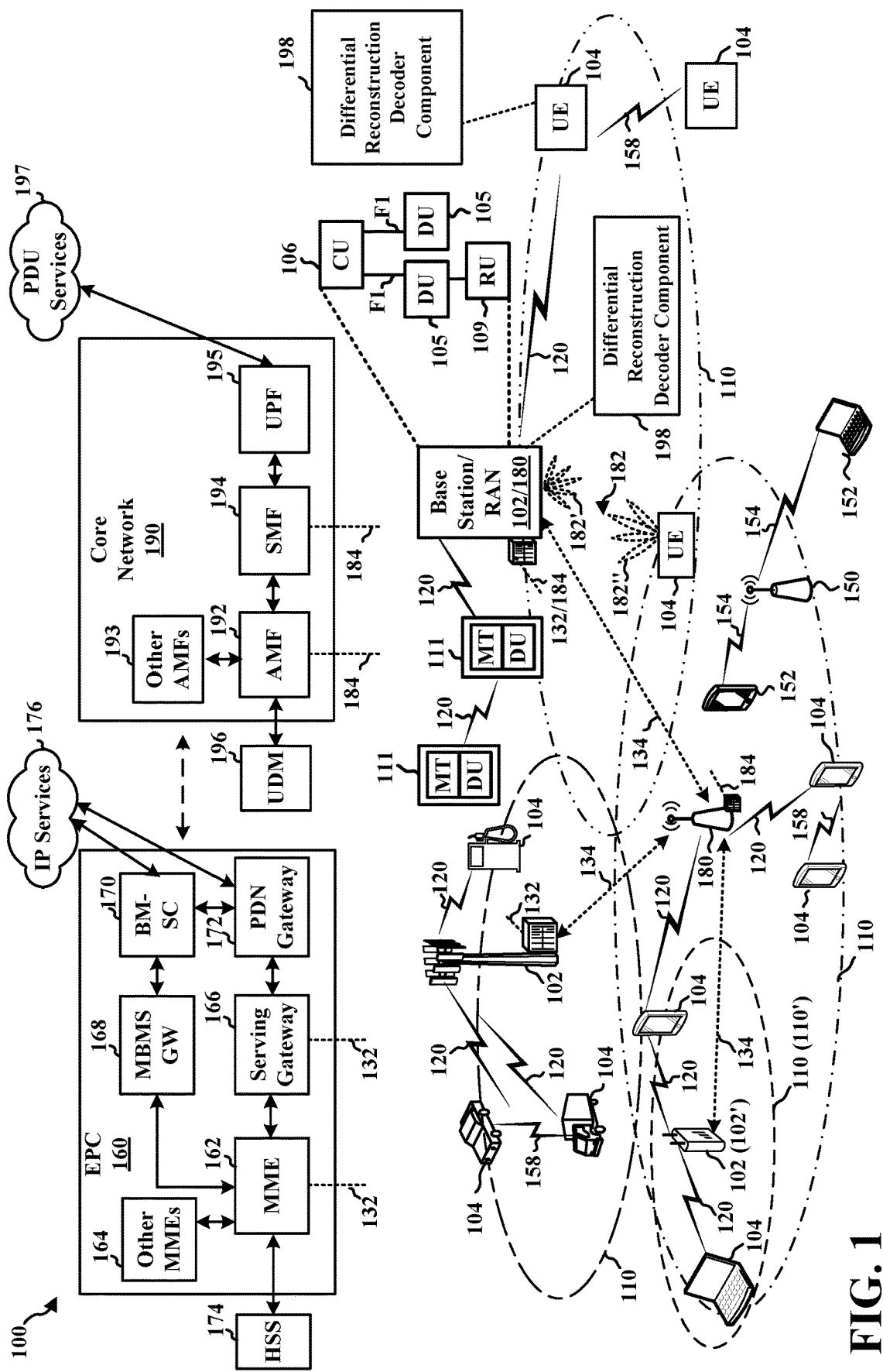
FIG. 1 is a diagram illustrating an example of a wireless communications system and an access network, in accordance with various aspects of the present disclosure.

A coherent communication system may use a pilot signal or demodulation reference signal (DMRS) that is transmitted along with information in order to assist the receiver in obtaining channel state information (CSI). The pilot signal or DMRS is known to the receiver, and the receiver may use the known signal to obtain information about the channel. For example, the receiver may use the pilot signal or DMRS in coherent communication to perform channel estimation and determine information about the channel, such as the fading coefficients, which the receiver may then use to decode the bits of information from the signal.

Energy and resources are used for the DMRS, or the pilot signal, yet the DMRS or pilot signal does not carry information. When the size of the transmitted information payload is small (e.g., small packet), the overhead due to DMRS or pilot signals become significant compared to the energy and resources available for transmitting the information payload. At a lower signal to noise ratio (SNR), channel estimation quality may be reduced, which can lead to performance degradation in coherent demodulation and decoding. In some aspects, non-coherent communication may be used to improve performance at lower SNR and/or to improve performance of small data/packet transmission. Non-coherent communication may refer to a communication scheme in which the transmitter does not transmit a pilot signal or DMRS. Rather than performing channel estimation based on a pilot or DMRS as in coherent communication, a receiver may infer the information directly from the received signal without performing channel estimation. Aspects presented herein provide for reception of non-coherent communication in a way that reduces complexity at a receiver through differential reconstruction based decoding of non-coherent communication. The aspects presented herein may enable more efficient use of wireless resources and/or saved energy through the improved decoding of the communication without a pilot signal or DMRS.

As presented herein, a receiver may receive a non-coherent signal, such as a non-coherent Reed Muller coded signal, and may determine a first differential of the received non-coherent signal on each of multiple receive antennas for a set of binary vectors to obtain a lower order representation of the non-coherent signal. The receiver may combine the differentials across antennas, decode the lower order representation of the non-coherent signal, and reconstruct a higher order representation of the non-coherent signal based on the decoded lower order representation of the non-coherent signal. The receiver may combine a complex conjugate of the received non-coherent signal with the received non-coherent signal per antenna to cancel a channel phase before combining the first differential across the multiple receive antennas. The receiver may be configured to cancel coefficients of the higher order representation from the non-coherent signal, recursively decode lower order representations (e.g., which may be referred to as lower order tensors in some aspects) based on differentiation, and output the coefficients from each order of representation of the non-coherent signal. In some aspects, the receiver may be configured to aggregate a signal estimate per antenna based on a differential between codewords at pairwise locations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and/or another core network 190 (e.g., a 5 G Core (5 GC)). The base stations 102 may include macrocells (high power cellular base station) and/or small cells (low power cellular base station). The macrocells include base stations. The small cells include femtocells, picocells, and microcells.

The base stations 102 configured for 4 G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5 G NR (collectively referred to as Next Generation RAN (NG-RAN)) may interface with core network 190 through second backhaul links 184. In another deployment example, the base station may also be configured to support 4 G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184(e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 / UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate in the form of vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), and/or a combination thereof and/or with other devices, which can be collectively referred to as vehicle-to-anything (V2X) communications. Sidelink communication may be based on V2X or other D2D communication, such as Proximity-based Services (ProSe), etc. In addition to UEs, sidelink communication may also be transmitted and received by other transmitting and receiving devices, such as Road Side Unit (RSU) 107, etc. Sidelink communication may be exchanged using a PC5 interface.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5 G NR, two initial operating bands have been identified as frequency range designations FR1 (410 MHz-7.125 GHz) and FR2 (24.25 GHz- 52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5 G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5 G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions . The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user plane PDU session packets, e.g. IP, Ethernet, or unstructured packets, are transferred through the UPF 195. The UPF 195 may provide UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. Connections between these devices may be Wi-Fi, Bluetooth, Sidelink, or other D2D communication technologies.

Referring again to FIG. 1, in certain aspects, a receiver, such as a base station 102/180, a component of a base station, an IAB node 111, or a UE 104 may include a differential reconstruction decoder component 198 configured to receive a non-coherent signal; determine a first differential of the received non-coherent signal on each of one or more receive antennas for a set of binary vectors to obtain a lower order representation of the non-coherent signal; combine the differentials across antennas, decode the lower order representation of the non-coherent signal based on the first differential of the non-coherent signal; and reconstruct a higher order representation of the non-coherent signal based on the decoded lower order representation of the non-coherent signal. The receiver may combine a complex conjugate of the received non-coherent signal with the received non-coherent signal per antenna to cancel a channel phase before combining the first differential across the multiple receive antennas. The receiver may be configured to cancel coefficients of the higher order representation from the non-coherent signal; recursively decode lower order representations based on differentiation; and output the coefficients from each order of representation of the non-coherent signal. In some aspects, the receiver may be configured to aggregate a signal estimate per antenna based on a differential between codewords at pairwise locations. Although the following description may be focused on 5 G NR, the concepts described herein may be applicable to other similar areas, such as LTE, LTE-A, CDMA, GSM, and other wireless technologies.

FIG. 2A is a diagram 200 illustrating an example of a first subframe within a 5 G NR frame structure. FIG. 2B is a diagram 230 illustrating an example of DL channels within a 5 G NR subframe. FIG. 2C is a diagram 250 illustrating an example of a second subframe within a 5 G NR frame structure. FIG. 2D is a diagram 280 illustrating an example of UL channels within a 5 G NR subframe. The 5 G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5 G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5 G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
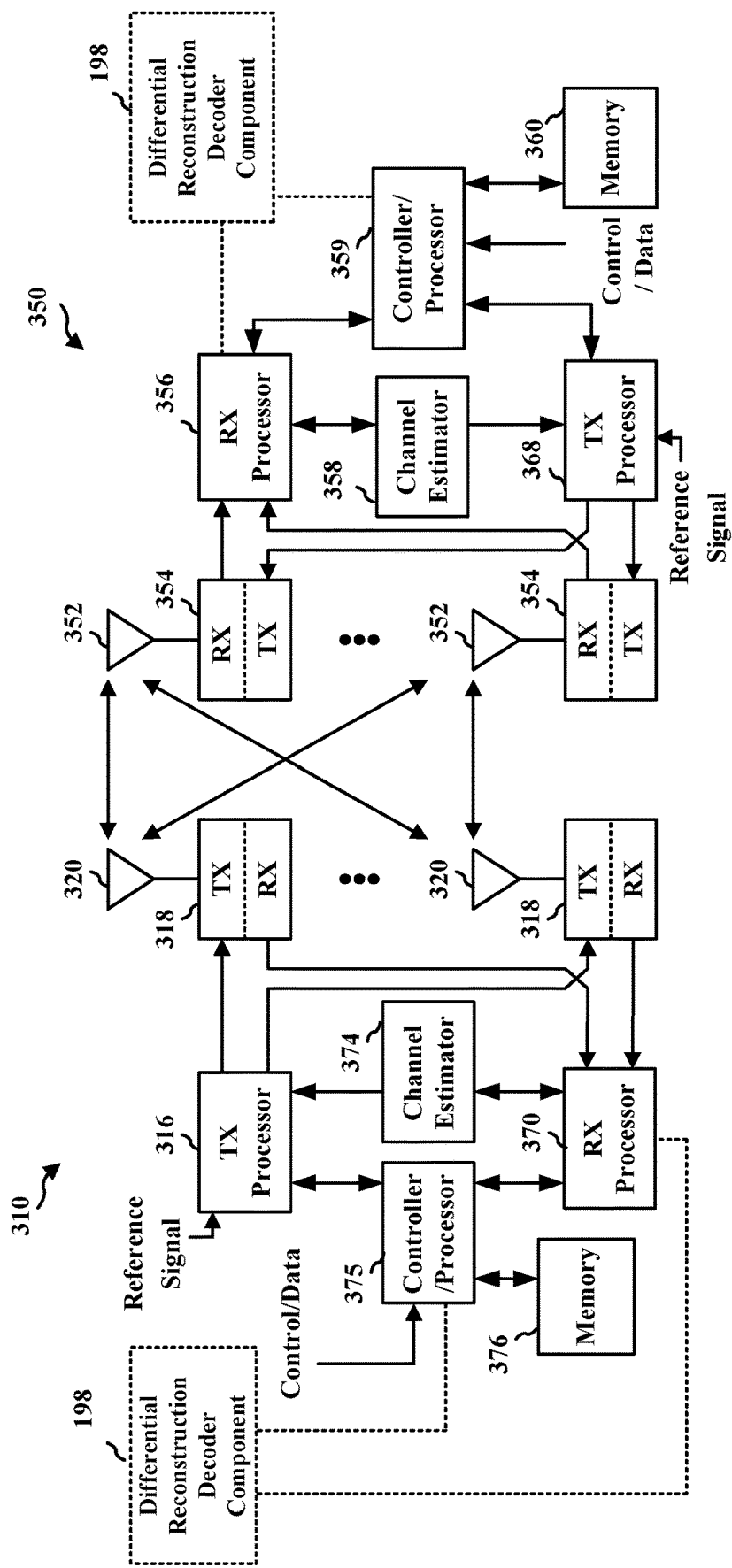
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316 or 368, the RX processor 356 or 370, and the controller/processor 359 or 375 may be configured to perform aspects in connection with a differential reconstruction decoder component 198 of FIG. 1.

FIG. 4A illustrates an example of a coherent communication system 400. The coherent communication system 400 may use a pilot signal or demodulation reference signal that is transmitted along with information in order to assist the receiver in obtaining channel state information (CSI). The pilot signal or DMRS is known to the receiver, and the receiver may use the known signal to obtain information about the channel.

A wireless channel may be modeled by $y_i = h_i x_i + n_1$, where $x_i$ denotes the signal, $h_i$ represents the fading coefficients, and $n_1$ represents noise. The fading coefficients is unknown, e.g., a-priori unknown, to the receiver and may randomly rotate and/or stretch/squeeze the signal. For example, each bit x of the signal may be modulated as −1 or 1 with Binary phase-shift keying (BPSK) or pi/2 BPSK modulation, as shown in FIG. 5A. In the example diagram 500 in FIG. 5A, the receiver may decode the bit by determining whether the modulated bit is a −1 or a 1. However, the fading coefficients may change a phase of the signal, e.g., rotating a signal as shown in the example 510 FIG. 5B, in which −1 and 1 are rotated relative to FIG. 5A. The example 520 in FIG. 5C illustrates that the fading coefficients may be rotated so that the positions of 1 and −1 are reversed. FIG. 5D shows a compressed example 530 in which the −1 and 1 are closer than in FIG. 5A, and FIG. 5E shows an expanded example 540 in which the −1 and 1 are expanded or stretched relative to the example in FIG. 5A. The coherent communication system of FIG. 4A enables a receiver to use the known pilot signal or DMRS to determine information about the channel, such as the fading coefficients, which the receiver may then use to decode the bits of information from the signal.

FIG. 4A shows, at 404, that the transmitter inserts a pilot signal 406, DMRS, or other reference signal along with data 408 that has coding and modulation applied at 402. The data 408 and pilot signal 406 or DMRS are transmitted on a wireless channel 410. The channel may refer to the physical medium over which the radio signal is communicated. The receiver receives the transmission on the channel 410 and performs channel estimation, at 412, based on the inserted pilot signal 406 or DMRS. For example, the channel estimation may include determining the fading coefficients for the channel. Channel estimation may include learning information or properties of the channel. The receiver then uses the channel estimation to demodulation and decode the information in the received transmission, at 414. In the example in FIG. 4A, the reception is based on channel estimation followed by coherent demodulation and decoding.

Energy and resources are used for the DMRS, or pilot signal, yet the DMRS or pilot signal does not carry information. When the size of the transmitted information payload is small (e.g., small packet or a payload below a size threshold), the overhead due to the DMRS or pilot signals become significant compared to the energy and resources available for transmitting the information payload. At a lower signal to noise ratio (SNR), channel estimation quality may be reduced, which can lead to performance degradation in coherent demodulation and decoding. In some aspects, non-coherent communication may be used to improve performance at lower SNR and/or to improve performance of small data/packet transmission.

FIG. 4B illustrates an example non-coherent communication system 450. Non-coherent communication may refer to a communication scheme in which the transmitter does not transmit a pilot signal or DMRS. Rather than performing channel estimation based on a pilot or DMRS as in coherent communication, a receiver may infer the information directly from the received signal without performing channel estimation. In some aspects, non-coherent communication may be referred to as DMRS-less communication. FIG. 4B shows that a transmitter performs coding and modulation, at 422, to data 424. The coded and modulated data is then transmitted in a transmission on the channel 426. The receiver receives the transmission on the channel 426 and performs demodulation and decoding, at 428, in order to obtain the data information carried in the signal. In contrast to the coherent communication system of FIG. 4A, the non-coherent communication system in FIG. 4B does not insert a pilot signal or DMRS with the data 424.

Non-coherent communication uses channel coherence in order to enable the receiver to demodulate and decode information, e.g., data, without channel estimation based on a pilot or DMRS. For example, a noncoherent communication scheme uses the correlation between channel realization for adjacent coded symbols (either put in adjacent time or frequency resources). For example, the channel realization may be the same or strongly correlated in the adjacent coded symbols. Such a communication system may expect a channel to remain relatively constant, or the same, over a period of time or frequency. In some aspects, the receiver may perform differential modulation in which the information is modulated based on a phase difference between two adjacent coded symbols. For example, the information is indicated by the phase difference between adjacent coded symbols rather than the coded symbols themselves. Such communication may be based on a channel that is the same across the adjacent symbols or REs. The receiver may be able to recover the transmitted signal by comparing the phase differences between the signal received on the adjacent symbols. In a sequence-based transmission scheme, the information may be modulated jointly on a sequence of symbols.

In order to have a good performance at a low SNR, the noncoherent communication scheme may exploit as much channel coherence as possible. For example, a longer channel coherence may improve demodulation and decoding of the information carried in the signal. However, a longer channel coherence, e.g., the time duration/bandwidth over which the channel remains the same, corresponds to a longer memory and a larger receiver complexity in order to jointly process the signals in the longer channel coherence. For example, decoding complexity may be exponentially related to the channel coherence and/or the payload size.

Aspects presented herein provide for the energy saving and resource efficient of noncoherent communication that does not include an inserted pilot signal or DMRS while also providing a reduced complexity at the receiver and makes use of a longer channel coherence. The aspects presented herein provide channel coding and decoding implementations that work without channel estimation, e.g., noncoherent decoding implementations that also help to reduce receiver complexity. As an example, the reduced complexity decoding method may be for noncoherent Reed Muller code that uses a differential structure of the code in receiving the signal.

Reed Muller code includes a group of linear block codes or algebraic code. Two of the parameters for Reed Muller codes are order r, and dimension m, in which 0<=r<=m. For a pair of integers r and m, the block length (after encoding) of the Reed Muller code is N =$2^m$, and the maximum payload size is $$K = \sum_{j=0}^{r} \binom{m}{j}.$$

The payload size refers to the number of information bits. Reed Muller codes have algebraic properties.

A Reed Muller code may be represented with a polynomial representation. For a given r (e.g., order) and m (e.g., dimension), the Reed Muller code may be represented as a set of binary vectors:

{Eval(f):f ∈ $F_2[z_1, \ldots, z_m]$, deg(f)≤r}

In this representation, Eval(f) indicates the value of a function f evaluated at each length-m binary vector, i.e., all z ∈ $F_2^m$ over the binary field $F_2$ of dimension m. For example, if the length is 3, the receiver may evaluate f (000), f (001), f (010), f (011), f (100), f (101), f (110), and f (111).

In other words, each Reed Muller codeword is a binary multivariate polynomial function of order <r. The information bits of each codeword have a one-to-one mapping to the coefficients of the function f. Decoding the Reed Muller code may correspond to decoding the coefficients of the function f. For example, f ($x_1, \ldots, x_m$)=1+$x_1$+$x_3$+$x_2 x_3$ represents the information set [1,1,0,1,0,0,1]. More specifically, f ($x_1, \ldots, x_m$)=1+$x_1$ +0·$x_2$ +$x_3$+0·$x_1 x_2$+0·$x_1 x_3$+$x_2 x_3$, with the coefficients in the polynomial being [1,1,0,1,0,0,1]. The coefficients, e.g., [1,1,0,1,0,0,1], before each monomial term in the polynomial carry the information for the signal.

Among other types, Reed Muller codes may include a $0^{th}$ order code, which is a repetition, a first order code, which is a Hadamard code, or a second order code, which is a binary chirp code.

Figure 6:
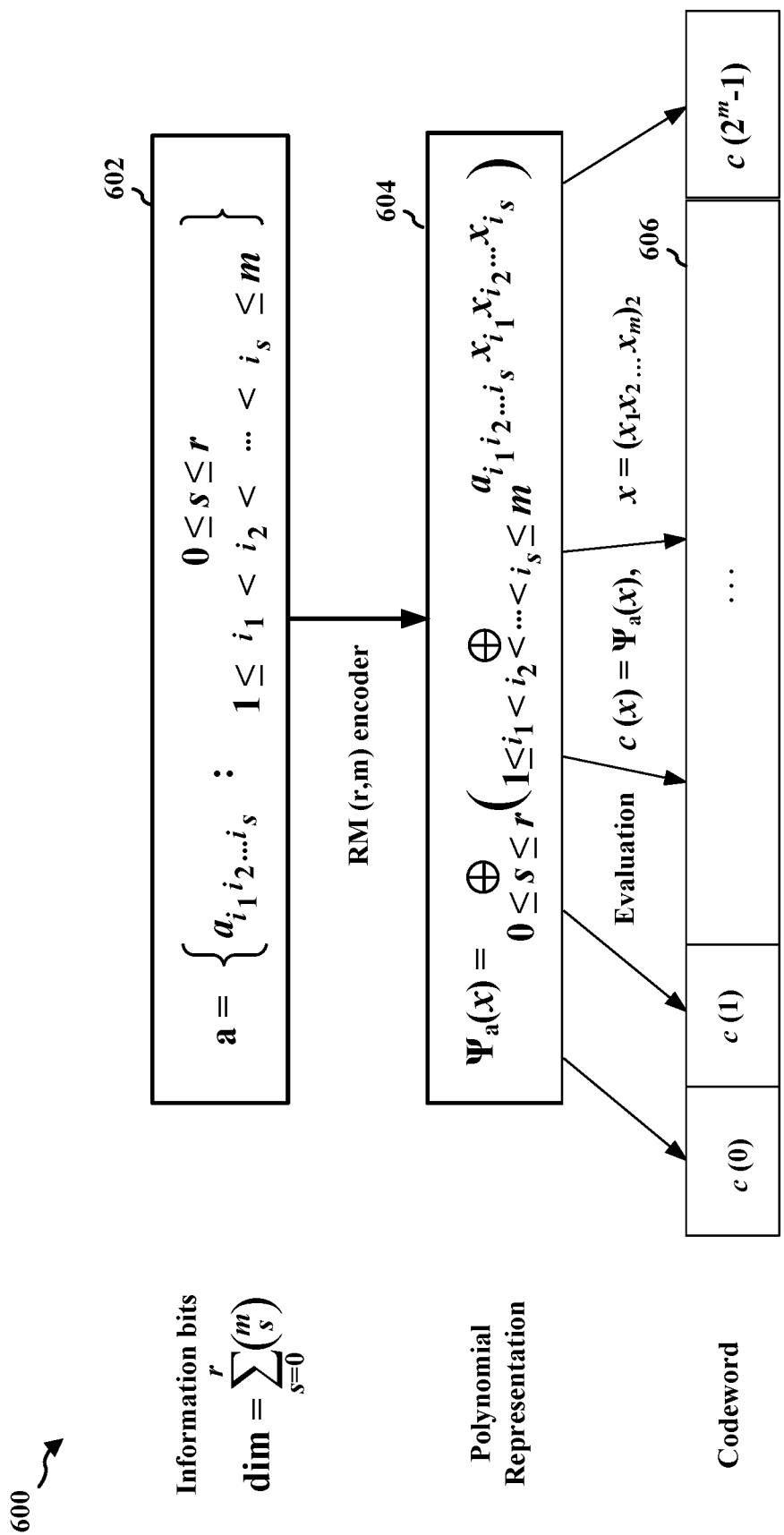
FIG. 6 illustrates example aspects of a codeword based on a Reed Muller code, in accordance with various aspects of the present disclosure.

FIG. 6 illustrates an example of Reed Muller code 600 of order r and dimension m, e.g., RM (r, m) showing how information bits 602, e.g., {a . . . }, are represented by the polynomial representation 604 after application of the Reed Muller encoder to provide a codeword 606. The Reed Muller code maps the information bits to a degree r polynomial in m variables. In encoding the signal at the transmitter, the transmitter may evaluate a function f at all (or a subset) of the $2^m$ possible binary length-m vectors, as the transmitter knows the polynomial function. A receiver that does not know the polynomial function may observe the value of the function for each (or a subset) of the $2^m$ possible binary length-m vectors. The receiver may then reconstruct the polynomial function based on the observations.

In FIG. 6, the ⊕ operator indicates a binary operation, e.g., XOR operation. In the polynomial representation 604, $\psi_a(x)$ represents the binary polynomial function with coefficients given by the elements in the binary vector a, and x represents the length-m binary vector on which the function $\psi_a(x)$ is evaluated.

The algebraic properties of the Reed Muller code may enable use of the code for non-coherent communication, e.g., without a pilot or DMRS for channel estimation. However, the zero order coefficients of the Reed Muller may not be decoded noncoherently. For f($x_1, \ldots, x_m$)=1+$x_1$+$x_3$+$x_2 x_3$, in which "+" represents a binary XOR, the zero order polynomial is the "1" shown in bold. The zero order coefficient is a "0" or a "1" that is a constant term added to each of the coded bits. The codewords corresponding to the information bit sequences (1,xxxxx) and (0,xxxxx) would only differ by a universal sign, e.g., under BPSK modulation or QPSK modulation. For example, the first bit sequence (1, xxxxx) would be $x_1, x_2, x_3, \ldots, x_n$, where n=$2^m$, and the second bit sequence (0,xxxxx) would be $-x_1, -x_2, -x_3, \ldots, -x_n$. If the channel phase changes by 180°, such as shown for FIG. 5A and 5C, the two codewords may not be distinguishable in noncoherent communication by the receiver, which does not know the phase of the channel. In some aspects, Reed Muller code with noncoherent communication may have a block error rate (BLER) of >0.5. A noncoherent Reed Muller code may be obtained by fixing, or maintaining, the zeroth order coefficient to a constant value. For example, the $0^{th}$ order coefficient may be maintained at 0, and the receiver may know that the $0^{th}$ order coefficient will be 0. In other examples, the $0^{th}$ order coefficient may be maintained at 1, and the receiver may know that the $0^{th}$ order coefficient will be 1. In some aspects, the Reed Muller code having a constant or fixed $0^{th}$ order coefficient may be referred to as a modified Reed Muller code or a shortened Reed Muller code. The Reed Muller code is in the binary field, and the transmitted signal is in a complex field, e.g., with the Reed Muller code mapped to a complex codeword based on modulation such BPSK (e.g., pi/2 BPSK), QPSK, etc. As the wireless signal is BPSK modulated or QPSK modulated, the code may be referred to as BPSK modulated non-coherent Reed Muller code or as QPSK modulated non-coherent Reed Muller code, which may be referred to more simply as noncoherent Reed Muller code. Although BPSK or QPSK are given as examples, the decoder algorithm presented herein can also be generalized to decode Reed Muller code modulated by other types of modulation, such as pi/2 BPSK, M-ary PSK (e.g., M is a positive integer) etc.

Figure 7:
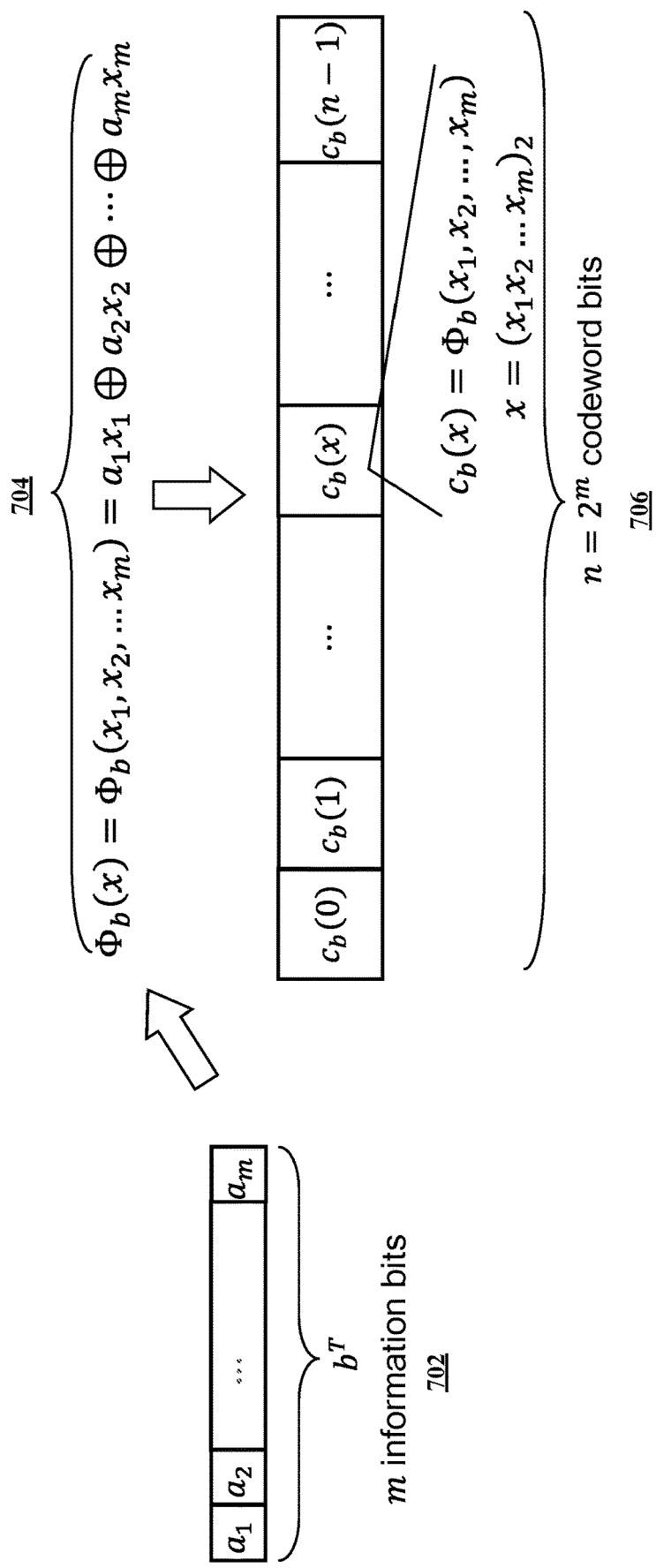
FIG. 7 illustrates example aspects of a first order Reed Muller code, in accordance with various aspects of the present disclosure.

FIG. 7 illustrates an example 700 of information bits 702 coded with a first order Reed Muller code, e.g., RM (1, m) to generate a polynomial, e.g., as shown at 704, that provides codeword bits 706. In the example in FIG. 7, the Reed Muller code provides a first order polynomial having m variables or coefficients. The information bits 702 may form a length m vector, which is referred to as b in FIG. 7. The polynomial function $\Phi_b$, as shown at 704, shows that each of the information bits $a_1, a_2, \ldots, a_m$ are applied in the polynomial as coefficients along with $x_1, x_2, \ldots, x_m$. The BPSK modulated codeword has the form $((-1)^{b^T x})_{x \in F_s^m}$, where b=$[a_1, a_2, \ldots, a_m]^T$, and the superscript T represents transpose.

The modified first order RM code (with BPSK modulation) obtained by setting $a_0$=0 is the set of the Walsh-Hadamard sequences. The first order Reed Muller code can be efficiently decoded, without channel estimation, over a fading channel using the fast Hadamard Transform (FHT).

Figure 8:
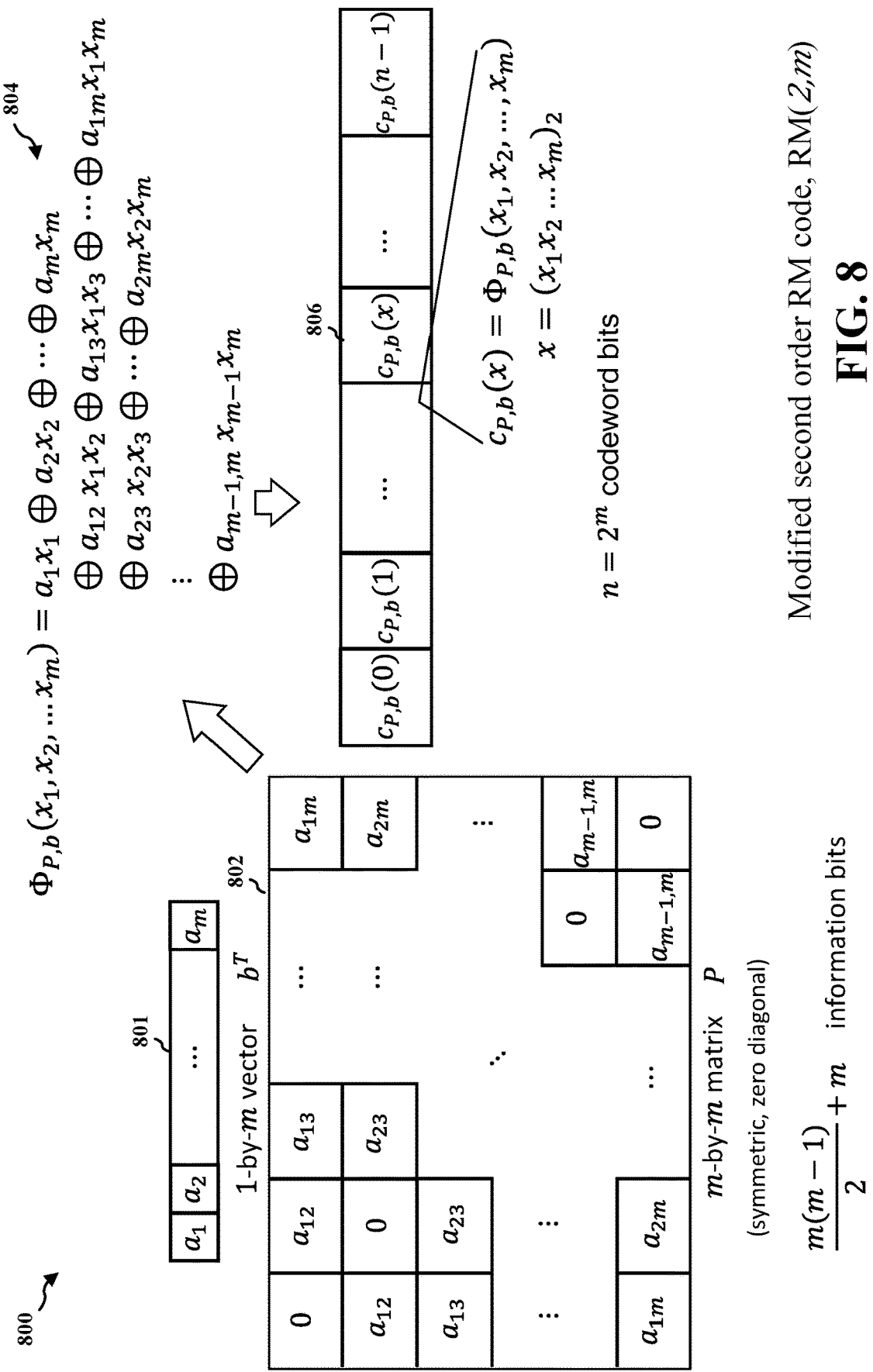
FIG. 8 illustrates example aspects of a second order Reed Muller code, in accordance with various aspects of the present disclosure.

FIG. 8 illustrates an example 800 in which the information bits 802 are coded with a second order Reed Muller code, e.g., RM (2, m) to generate a polynomial 804 that provides codeword bits 806. In comparison to the bits being in a 1-by-m vector b 801, as in FIG. 7, in FIG. 8, the information bits are in an m-by-m matrix P, and the vector b. The matrix P is symmetric and has zero values at the diagonal. The information bits in the matrix P may be associated with the second order coefficients, and the vector b may be associated with the first order coefficients. The matrix P and vector b includes m(m-1)/2+m in information bits in total. The second order Reed Muller code can be represented as a polynomial $\Phi_{P,b}$ 704. In FIG. 8, a BPSK modulated second order Reed Muller codeword can be written as $(-1)^{b^T x}(1j)^{x^T P x}$. Decoding the codeword at the receiver may be equivalent to decoding the matrix P and the vector b. In addition to the examples illustrated in FIG. 7 for the first order Reed Muller code and in FIG. 8 for the second order Reed Muller code, a third order Reed Muller code, fourth order Reed Muller code, etc. may be used.

As described herein, a Reed Muller codeword may be considered as a binary polynomial, and mathematically, the decoding may be based on polynomial reconstruction. The goal of the decoding may be to recover the coefficients of the polynomials that represent the Reed Muller codeword, because the coefficients may represent the information carried in the signal.

Aspects presented herein include decoding in which coefficients of different polynomial orders may be reconstructed at different steps of the decoding procedure. The decoding presented herein is based on a differential property of the Reed Muller code. The differential of the Reed Muller code of order r is a Reed Muller code of the order r-1. There are 2 m way, or directions, to compute the differential (also known as directional differential or a directional directive), each of which will result in a different Reed Muller code of degree r-1. For example, if $c:=(c(z), x \in \mathbb{F}_2^m) \in RM(r, m)$, then for any $\alpha \in \mathbb{F}_2^m$, the differential $D_\alpha$ based on a direction $\alpha$, is $D_\alpha c := (c(x) \oplus c(x \oplus a), x \in \mathbb{F}_2^m) \in RM(r-1, m)$. Taking a (directional) differential (aka directive) of the polynomial function for the Reed Muller code of a degree r gives another polynomial function of degree r-1 (i.e., 1 degree lower than the original polynomial function). The receiver may continue to perform the differentials to obtain additional lower order polynomial functions until obtaining a first order polynomial function. The receiver may decode the first order polynomial function, e.g., based on FHT, and may use the decoded lower order polynomial to then decode the higher order polynomials.

Figure 9:
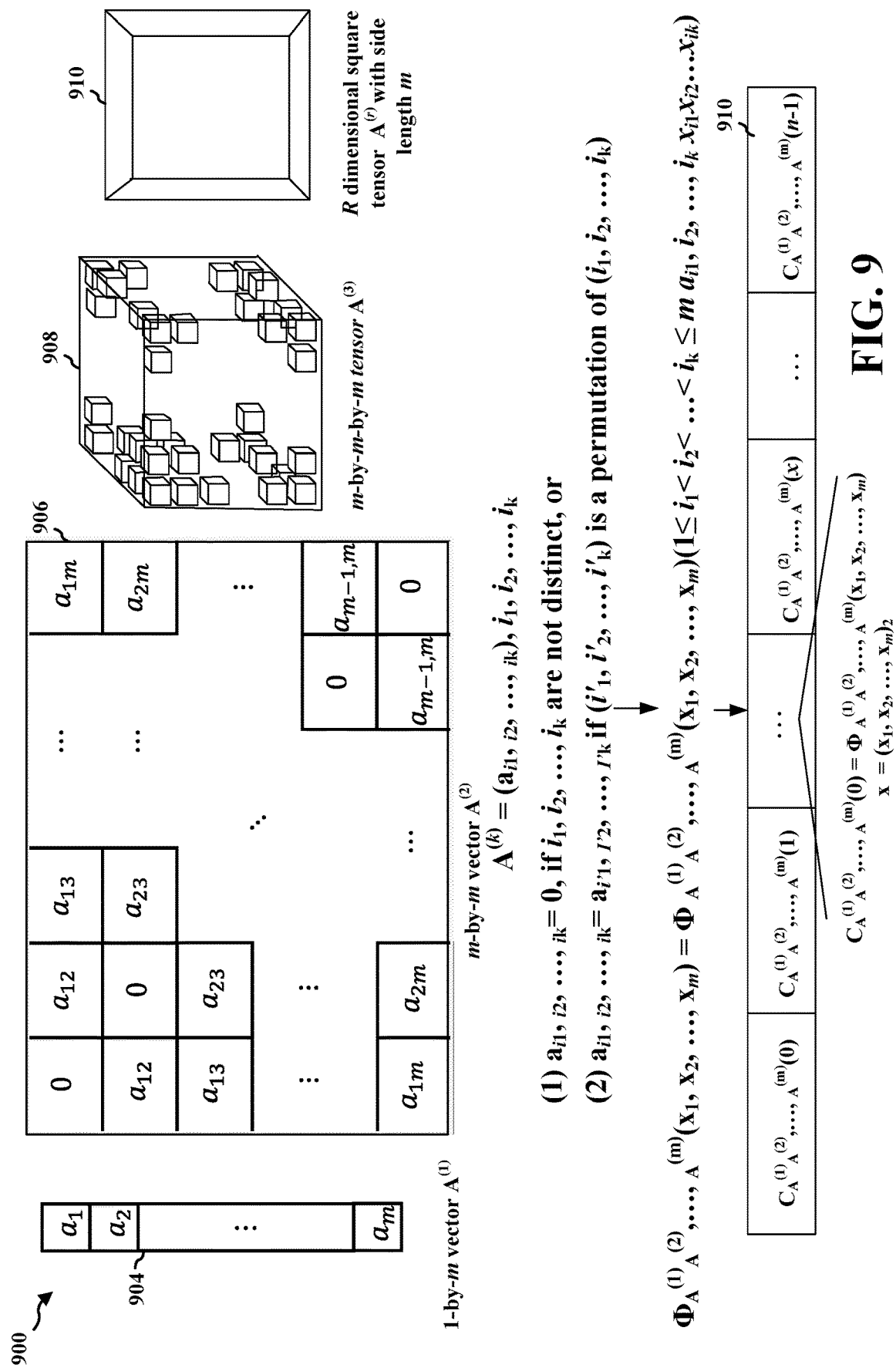
FIG. 9 illustrates example aspects of Reed Muller code of various orders, in accordance with various aspects of the present disclosure.

FIG. 9 illustrates a graphical representation 900 of a noncoherent Reed Muller code RM (r,m), and showing the different orders. At 904, FIG. 9 illustrates a 1-by-m vector $A^{(1)}$. At 906, FIG. 9 illustrates an m-by-m vector $A^{(2)}$. At 908, FIG. 9 illustrates an m-by-m-by-m tensor $A^{(3)}$. At 910, FIG. 9 illustrates an r-dimensional square tensor $A^{(r)}$ with a side length of m. FIG. 9 illustrates that the polynomial representation:

$$A^{(k)} = (a_{i1, i2, \ldots, ik}), i_1, i_2, \ldots, i_k \in \mathbb{F}_2$$

Corresponds to
(1) $a_{i1, i2, \ldots, ik} = 0$, if $i_1, i_2, \ldots, i_k$ are not distinct, or
(2) $a_{i1, i2, \ldots, ik} = a_{i'1, i'2, \ldots, i'k}$ if $(i'_1, i'_2, \ldots, i'_k)$ is a permutation of $(i_1, i_2, \ldots, i_k)$ As shown in FIG. 9, $\Phi_{A^{(1)} A^{(2)}, \ldots, A^{(m)}}(x_1, x_2, \ldots, x_m) = \Phi_{A^{(1)} A^{(2)}, \ldots, A^{(m)}}(x_1, x_2, \ldots, x_m)(1 \leq i_1 < i_2 < \ldots < i_k \leq m \ a_{i1}, i_2, \ldots, i_k x_{i1} x_{i2} \ldots x_{ik})$, and the corresponding codeword is shown at 912. The receiver may decode the codeword as an equivalent to decoding, e.g., obtaining the coefficients for, the tensors $A^{(1)}, A^{(2)}, A^{(3)}, \ldots, A^{(r)}$.

Figure 10:
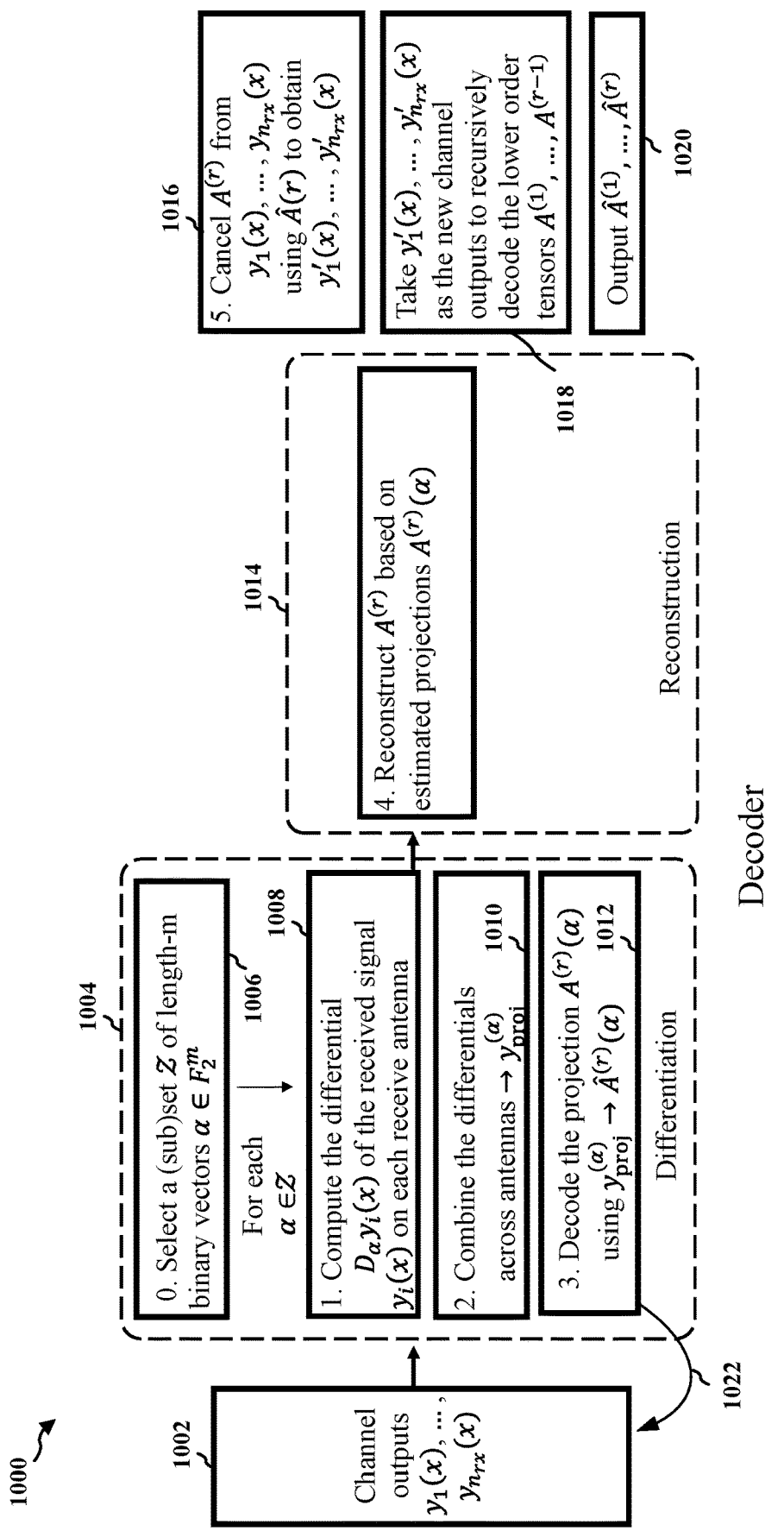
FIG. 10 illustrates example aspects of a noncoherent Reed Muller differential and reconstruction based decoder, in accordance with various aspects of the present disclosure.

FIG. 10 illustrates example aspects of a noncoherent Reed Muller decoder 1000. The receiver receives the signal, $y_1(x), \ldots, Y_{n_{rx}}(x)$, at multiple receive antennas, as shown at 1002. In this signal, x, refers to the binary vector of length $2^m$, and there are $n_{rx}$, of receive antennas. The signal may be referred to as channel outputs, e.g., the channel output by the transmitter. For example, the receiver may receive the signal at two antennas, e.g., receiving signal $y_1(x)$ at the first antenna and $y_2(x)$ at the second antenna. Although this example is described for two antennas, the receiver may receive the signal at more than two antennas. At 1004, the receiver performs a differentiation. At 1006, the receiver selects a set, e.g., a subset Z, of length-m binary vectors $\alpha \in \mathbb{F}_2^m$. The selected subset of vectors may be referred to as directional vectors, for a set of directions $\alpha$, with $\alpha_1, \ldots, \alpha_{|z|}$, with a being non-zero. The receiver may select less than all of the possible directional vectors, e.g., selecting enough directions of the smaller dimension vector to enable a reconstruction of a larger order tensor.

At 1008, the receiver determines, or computes, the differential $D_\alpha y_i(x)$ of the received signal $y_i(x)$ on each receive antenna. The differential may also be referred to as a derivative of the received signal. For example, for a signal $y_1(x)$ at the first receive antenna and $y_2(x)$ at the second receive antenna, the UE may determine a differential $D_\alpha y_1(x)$ for the first antenna for a direction a and may determine a differential $D_\alpha y_2(x)$ for the second antenna for the direction a. The receiver performs the differential for each of directions in the subset of directions selected at 1006. Then, for each direction $\alpha$ in the set of directions, at 1010, the receiver combines the differentials across the multiple receive antennas to obtain $y_{projection}^{(\alpha)}$. Combining may refer to adding the differentials for each element across the different antennas, e.g., combining or adding the elements for $D_\alpha y_1(x) + D_\alpha y_2(x)$ for each direction $\alpha$ in the subset of directions. The signal corresponds to a lower order polynomial than the received signal. At 1012, the receiver decodes the projection $A^{(r)}(\alpha)$ using $y_{proj}^{(\alpha)} \rightarrow \hat{A}^{(r)}(\alpha)$. $A^{(r)}(\alpha)$ describes a lower order Reed Muller code, e.g., the coefficients of a lower Reed Muller code, and $\hat{A}^{(r)}(\alpha)$ denotes the estimate of $A^{(r)}(\alpha)$ that the receiver obtains based on the projected signal $y_{proj}^{(\alpha)}$. The receiver may recursively obtain a lower order Reed Muller code until obtaining a first order Reed Muller code that the receiver may decode using FHT. For example, the receiver may reduce a third order Reed Muller code to a second order Reed Muller code through a first differential operation, then may reduce the second order Reed Muller code to a first order Reed Muller code through a second differential operation. The receiver may then decode the first order Reed Muller code using FHT.

At 1006, the receiver may select the subset $\mathcal{Z} \subset \mathbb{F}_2^m$ in any of various ways. The receiver may select a reduced set of directions in order to reduce the complexity at the receiver, and may select directions that provide information in order to reconstruct the signal. As an example, for an m-by-m vector P, such as shown at 802 in FIG. 8, the directional vectors may correspond to an m-by-1 first order vector, such as illustrated by 801. The vector P, may be reconstructed based on m first order vectors, e.g., $P_{\alpha 1}, P_{\alpha 2}, \ldots, P_{\alpha m}$. The direction, a may be a non-zero number.

In a first aspect, the subset $\mathcal{Z}$ may be based on $\mathcal{Z} = \{e_1, \ldots, e_m\}$, where $e_1(k) = 1$ for k=i and $e_i(k) = 0$. The aspect may provide a set of m vectors. In another aspect, the subset $\mathcal{Z}$ may be based on binary vectors having a particular weight, such as $\mathcal{Z}$ =binary vectors of weight <m/2. In this aspect, the number of vectors in the subset is based on m and the weight. In some aspects, the subset may be a random subset, e.g., $\mathcal{Z} \subset \mathbb{F}_2^m$. In another aspect, the subset may be based on binary vectors of a particular length, such as all length m binary vectors. The subset may be represented as $\mathcal{Z} = \mathbb{F}_2^m$, which will include the set of all length-m vectors, which is of cardinality $2^m$.

Figure 11:
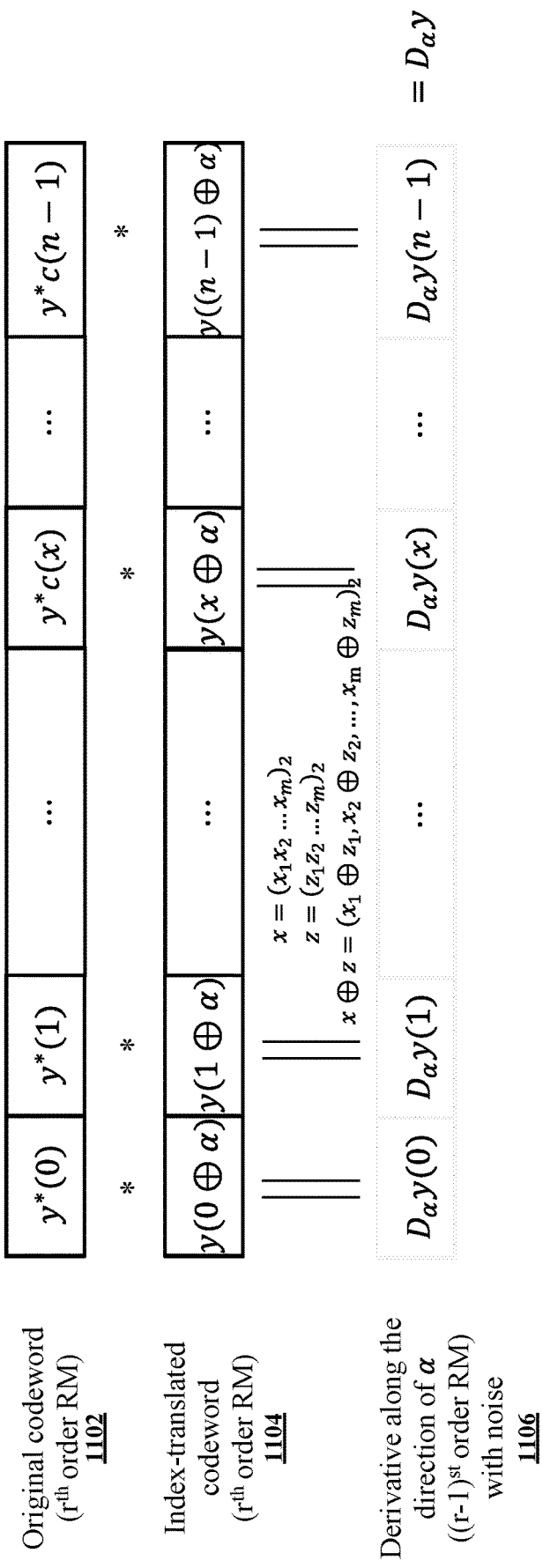
FIG. 11 illustrates example aspects of a differential based decoder, in accordance with various aspects of the present disclosure.

At 1008, determining the differential of the received signal on each receive antenna may be referred to as a per-antenna projection. As described herein, the received signal may correspond to y=hu+n, where y is the received signal, h represents the channel, u is the transmitted signal, and n is noise. When taking the differential (D), at 1008, $D_\alpha y_i(x) = \text{Re}(y_i^*(x) y_i(x \oplus \alpha)) = |h_i|^2 (-1)^{c(x) \oplus c(x \oplus \alpha)} + \text{noise}$, where $\{c(x) \oplus c(x \oplus \alpha)\}_x$ is an (r−1)-th order RM code whose (r−1) degree terms correspond to the information bits given by the (r−1) dimensional square tensor $A^{(r-1)}(\alpha)$. For a complex number, such as y, Re(y) corresponds to the real part of y. For example, the receiver may take the complex conjugate of the received signal and multiplex it with the signal at different locations/positions. FIG. 11 illustrates an example 1100 of an original codeword 1102 of order r, e.g., which corresponds to the received signal. FIG. 11 also shows the combination of the received signal, e.g., 1102, with the index translated codeword of the $r^{th}$ order Reed Muller code 1104 and the corresponding derivative 1106 along the direction of a, e.g., a Reed Muller code of order r−1, with noise. For example, y*(0) of the received signal, e.g., 1102, is combined with y(0⊕α) of 1104 to provide of the derivative $D_\alpha y$ 1106 at a location indexed by 0.

As an example, index 0 may correspond to a vector 0000, index 1 may refer to 0001, index 2 may refer to 0010, index 4 may refer to 0100, index 5 may refer to 0101, index 6 may refer to 0110, index 7 may refer to 0111, and so forth for the binary expansion of x (x_bin) up to the index of $N-2^{m-1}$ which corresponds to 1111. In an example in which α=0001, if index 0 (0000) is combined with a in an XOR operation, the result corresponds to index 1, e.g., 0001. If index 1 is combined with a in an XOR operation, the result corresponds to index 0, e.g., 0000. If index 5, e.g., 0101 is combined with α in an XOR operation, the result corresponds to index 4, e.g., 0100. If index 4, e.g., 0100 is combined with a in an XOR operation, the result corresponds to index 5, e.g., 0101. If index 6, e.g., 0110 is combined with a in an XOR operation, the result corresponds to index 7, e.g., 0111. If index 7, e.g., 0111 is combined with a in an XOR operation, the result corresponds to index 6, e.g., 0110, which enables the differential along neighboring elements. If alpha is 1000, enables a differential with a first element of a first half of the signal with a corresponding first element of the second half of the signal, a differential of the second element of the second half of the signal with a corresponding second element of the second half of the signal, and so forth. The differential assists in removing, or canceling, the (unknown) phase of the channel, e.g., h, from the received signal. By multiplying the conjugate of the received signal with the received signal, the receiver is able to remove the phase of the channel. The cancelation may be based on the channel phase remaining constant or almost constant. Removing the phase helps to address the unknown channel phase that may be introduced, as described in connection with FIGS. 5A-5E. The combination may be performed per receive antenna, e.g., individually for each antenna, to remove the channel phase. For example, signals on the same antenna will experience the channel phase similarly, whereas received signals on two different antennas may observe the phase of the channel differently.

Following the per antenna differential calculation, at 1008, the receiver combines the differential, e.g., $D_\alpha y_i(x)$ element wise across each of the receive antennas, at 1010, to obtain $y_{proj}$. The combination of the differential includes the additional of corresponding elements of the different differentials, which may be referred to as an elementwise addition of the signals. For example, $y_{proj} = D_\alpha y_1(x) + D_\alpha y_2(x)$.

The projected signal $y_{proj}$, e.g., which is a lower order Reed Muller code than the received signal, is a noisy (r−1) order Reed Muller function, e.g., a Reed Muller function that includes the noise of the received signal. The receiver may use the projected signal $y_{proj}$ to estimate the projected square tensor $A^{(r)}(\alpha)$ of order r−1.

The signal after the differential may be referred to as a projection, because it is a lower order Reed Muller code than the received signal. As an example, a matrix P, such as 802, that is multiplied by a direction α, gives a vector, such as 801. The larger dimensional matrix P is projected into the smaller dimensional object of the vector. Similarly, a higher dimensional tensor taken along a direction α, gives a lower dimensional tensor. The lower dimensional objects can be decoded, e.g., at 1012, and combined to reconstruct the larger order object.

At 1014, the receiver reconstructs the square tensor $A^{(r)}$ of order r from the projections $\{A^{(r)}(\alpha)\}_{\alpha \in z}$. As an example, if the larger order object is an m-by-m matrix P, such as 802, a first direction, such as $\alpha_1 = 0001$, may provide a first row of the matrix P, e.g., when multiplied with the matrix. A second direction, such as $\alpha_2 = 0100$, may provide a second row of the matrix P, a third direction may provide a third row of the matrix P, and continuing with each direction corresponding to a row of the matrix up to $\alpha_m$ that provides the last row, e.g., $m^{th}$ row, of the matrix P. In this example the reconstruction of the matrix may be performed by combining the lower order vectors, or rows, obtained for each of the in directions.

A higher number of projections may lead to a higher quality reconstruction. The set of directional vectors, e.g., the set of Z directional vectors, may be selected to span the binary field $F_2^m$, in order for the receiver to reconstruct the higher order representation of the signal. As an example, for a set of length-m binary vectors (e.g., directions) $\{a_1, a_2, \ldots, a_k\}$, k≥m, the whole field $F_2^m$ is spanned if the m*k matrix obtained by stacking the vectors $a_1, a_2, \ldots, a_k$ is of rank m. In particular, if k=m, the square matrix (e.g., the matrix obtained by stacking the row vectors $a_1 \ldots a_m$) are of full rank.

Once the differentials are combined across antennas, the receiver may perform a recursive step, as shown at 1022, in order to repeat the calculation of a differential, or derivative, to obtain successively lower orders of Reed Muller code before decoding the projected signal, or lower order signal, at 1012. For example, if the receiver receives a Reed Muller code of order r, after performing 1006, 1008, and 1010, the receiver may have obtained a Reed Muller code of order r−1. The receiver may reprocess the lower order code as a channel output by performing 1006, 1008, and 1010 to obtain a Reed Muller code of order r−2. The channel phase on the signal may already be removed in the first differential calculation. As an example, for the lower order Reed Muller code, an equivalent channel may become an additive white gaussian noise (AWGN) for a single receive antenna, and the differential may be performed differently from 1008 when decoding these lower-order square tensors. For the lower order Reed Muller code, the differential may be taken on an AWGN channel, and may be equal to:

$$log(e^{y(x)+y(x \oplus \alpha)}+1) - log(e^{y(x)} + e^{y(x \oplus \alpha)})$$

or equal to $$min\{|y(x)|, |y(x \oplus \alpha)|\} \cdot sign(y(x \oplus \alpha)).$$

The receiver may skip the multiplication with the complex conjugate of the signal, as the channel phase is already removed. The receiver may again process the lower order code of order r−2 by performing 1006, 1008, and 1010 to obtain a Reed Muller code of order r−3. For a Reed Muller code of order r, the differential from the order r to the order r−1 is different from the additional differentials, e.g., differentials from the order r−1 to r−2, from the order r−2 to r−3, etc. In other words, the first differential operation is different from the rest of differential operations.

For example, the receiver may implement two modules: one module for computing a differential from order r to r−1, and another module for performing the other differentials, e.g., from r−1 to r−2, r−2 to r−3 etc. The first module may not be reused to compute the additional differentials from order r−1 to r−2 (the original code being of order r). Instead, a new module may be implemented for the additional differentials as the math operations are different.

For a differential from an order r to an order r−1, the differential is performed across multiple antennas. For the differential from r−1 to r−2, r−2 to r−3 etc., each differential is performed on a single antenna, because there is a combining after the first differential operation, e.g., as shown at 1010 in FIG. 10.

The receiver may recursively determine a lower order code through a differential or derivative until obtaining a first order Reed Muller code that may be decoded, at 1012, e.g., based on FHT.

At 1014, the receiver performs a reconstruction based on the differentiation performed at 1004. At 1014, the receiver reconstructs the square tensor $A^{(r)}$ of order r based on the lower order estimated projections $\{A^{(r)}(\alpha)\}_{\alpha \oplus Z}$ obtained at 1004. For example, the receiver may reconstruct the square tensor $A^{(r)}$ of order r from the projections $\{A^{(r)}(\alpha)\}_{\alpha \oplus Z}$. The reconstruction of the highest order in the polynomial function for the Reed Muller code enables the receiver to cancel the lower orders.

At 1016, after the reconstruction of the coefficients for the higher order, e.g., highest order, polynomial representation of the received signal, the receiver cancels $A^{(r)}$ from the channel output on each receive antenna received as $y_1(x), \ldots, y_{n_{rx}}(x)$ using $\hat{A}^{(r)}$ to obtain $y'_1(x), \ldots, y'_{n_{rx}}(x)$. The receiver obtains a polynomial term of a Reed Muller code of a lower degree. Then, at 1018, the receiver takes $y'_1(x), \ldots, y'_{n_{rx}}(x)$ as the new channel outputs, e.g., at 1002, to recursively decode the lower order tensors $A^{(1)}, \ldots, A^{(r-1)}$. For example, after decoding $A^{(r)}$, the receiver may cancel the contribution from $A^{(r)}$ on each receive antenna $y'_i(x) = y_i(x) \times (-1)^{c_{0,0}, \ldots, A^{(r)}(x)}$; and may then take $y'_i(x)$ as the new channel output, e.g., at 1002, to decode the lower order tensors $A^{(r-1)}$ and then $A^{(r-2)}$. The receiver may recursively by apply 1004 and 1014 to obtain the coefficients of the progressively lower order polynomials. As an example, for r=1, the receiver may decode $A^{(1)}$ by first applying FHT to each $y_i$, combining the reliability for each of the candidate codewords across antennas and then choosing the most reliable estimate.

Then, at 1020, the receiver outputs $\hat{A}^{(1)}, \ldots, \hat{A}^{(r)}$. The receiver recovers each of the terms for the signal. The receiver may decode the coefficient of each of the orders of the Reed Muller code in order to recover the coefficient terms for the received signal. The use of the differential and reconstruction at 1004 and 1014, respectively, helps to reduce the complexity of the decoding at the receiver. For example, for an order 2 Reed Muller code, the complexity (0) for the receiver may correspond to $0(n^2)$, where n is based on the block length, and for an order 3, the complexity may correspond to $0(n^3)$, whereas without the differentiation and reconstruction, the complexity may be $0(e^n)$.

Figure 12:
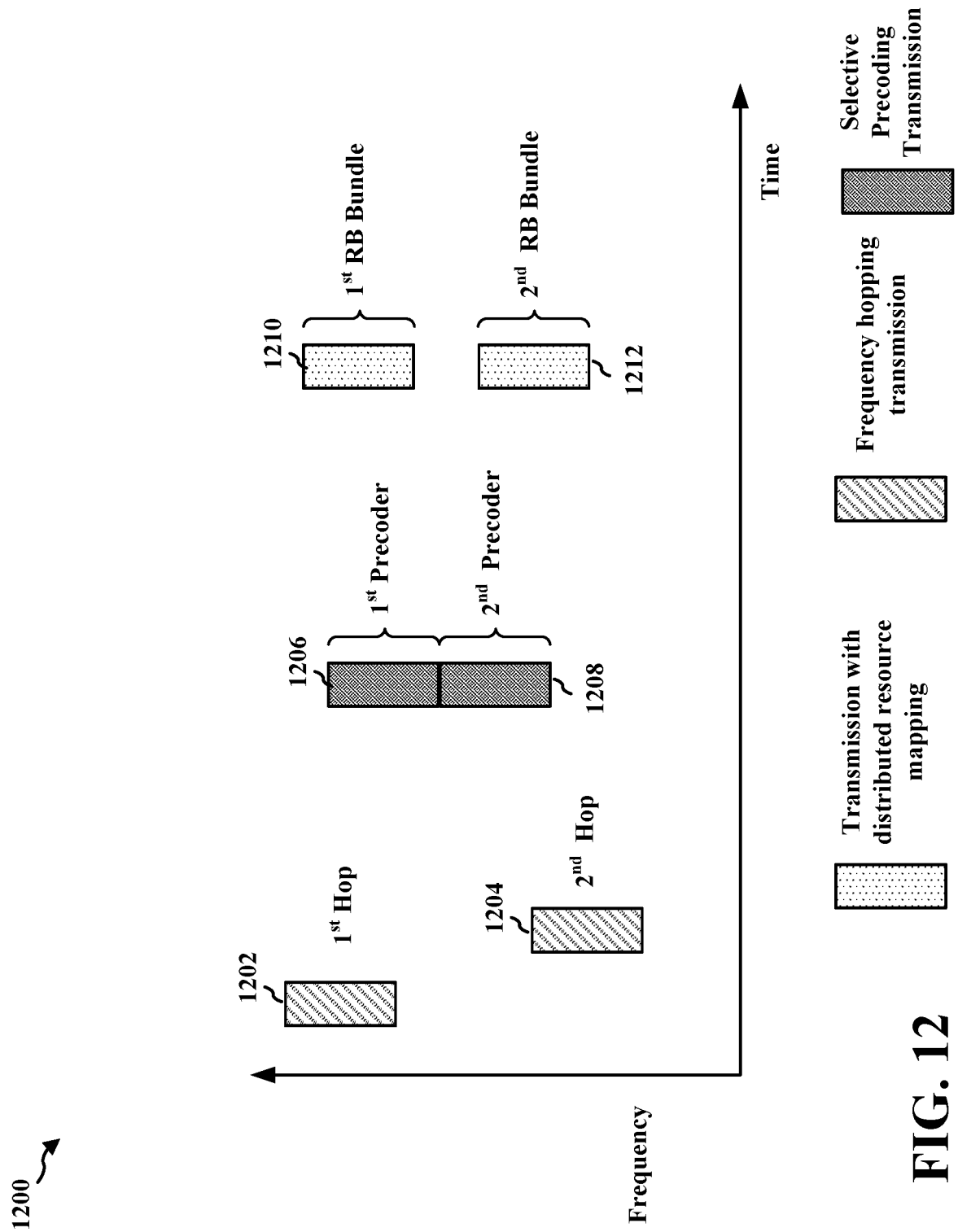
FIG. 12 illustrates example aspects of transmissions that include frequency hopping, distributed resource mapping, or selective precoding.

The example in FIG. 10 may be based on a channel being the same across all transmitted resources (e.g., across all transmitted symbols). In some aspects, a signal may employ frequency hopping, selective precoding, or distributive resource mapping. FIG. 12 illustrates a time and frequency diagram 1200 that includes an example of frequency hopping in which a first portion of a transmission 1202 is transmitted in a first frequency hop, and a second portion of the transmission 1204 is transmitted at a second frequency hop. FIG. 12 also illustrates an example of a distributed resource mapping transmission in which a first portion of the transmission 1210 is mapped to a first set of consecutive frequency resources and a second portion of the transmission 1212 is mapped to a second set of consecutive frequency resources. Whereas the frequency hopping transmission is transmitted in the different frequency hop at a different time, the distributed resource mapping transmission is transmitted in the non-consecutive frequency resources at the same time, or at an overlapping time. The first portion of the transmission 1210 may be referred to as a first resource block (RB) bundle, and the second portion of the transmission 1212 may be referred to as second RB bundle. FIG. 12 also illustrates an example of a transmission having different precoding applied to different portions. For example, a first portion of the transmission 1206 may be precoded with a first precoder, and the second portion of the transmission 1208 may be precoded with a second, different precoder. The first portion of the transmission 1206 may be referred to as a first precoding resource block group (PRG), and the second portion of the transmission 1208 may be referred to as second PRG.

Figure 13:
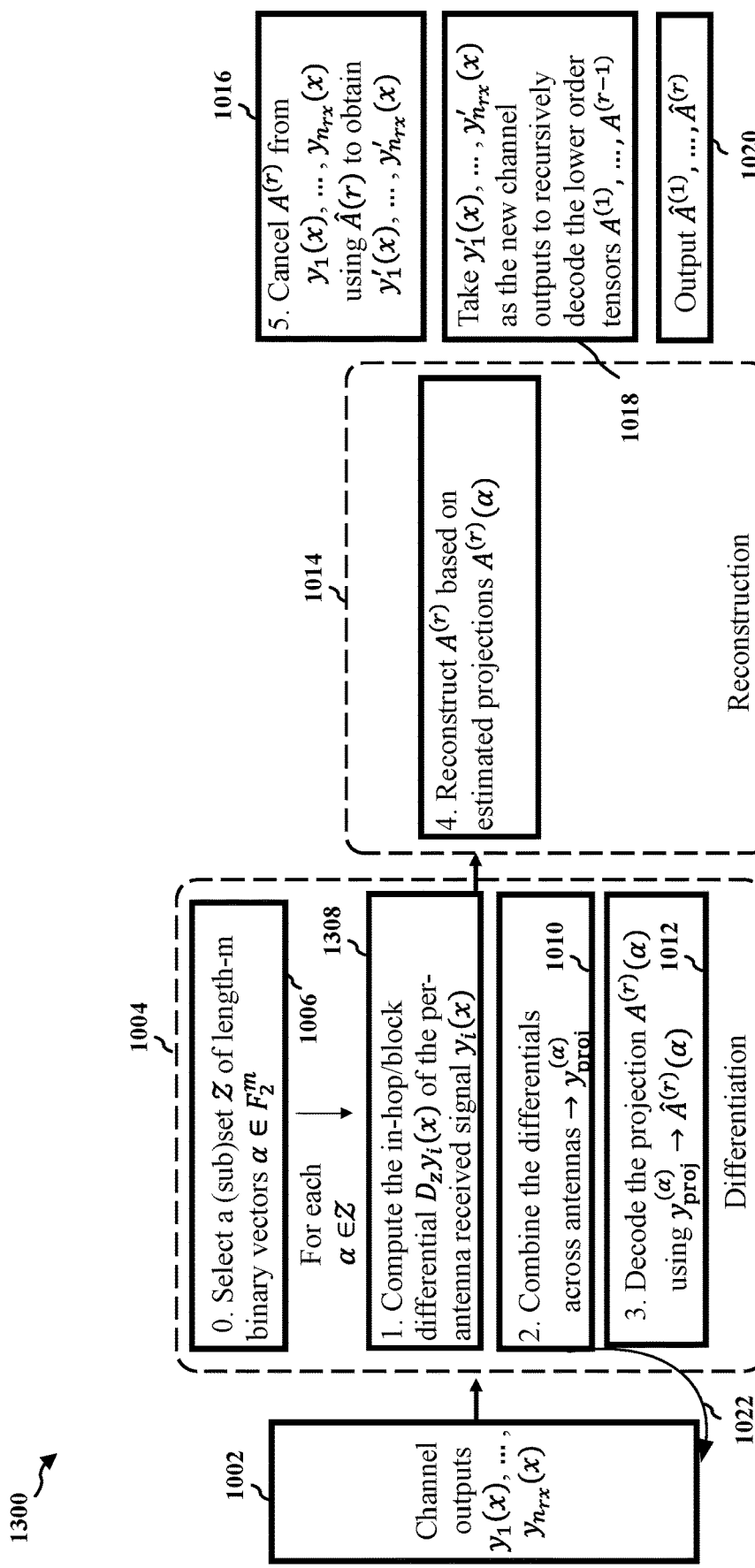
FIG. 13 illustrates example aspects of a noncoherent Reed Muller differential and reconstruction based decoder, in accordance with various aspects of the present disclosure.

FIG. 13 illustrates example aspects of a noncoherent Reed Muller decoder 1300 for decoding a signal with frequency hopping, selective precoding, or distributed resource mapping. The aspects of FIG. 13 that are similar to FIG. 10 are shown with the same reference number. In FIG. 13, at 1308, the receiver may determine, or compute, the in-hop or in-block differential $D_\alpha y_i(x)$ of the per-antenna received signal $y_i(x)$. The term "in-hop" as used herein refers to being within a single frequency hop of a transmission. The term "in-block" refers to being within a single coherence block of a transmission. The coherence block may refer to a single PRG in a transmission with selective precoding or a single RB bundle for a transmission with distributed resource mapping. The channel coefficients may be the same or similar in-hop or in-block, and the differential can be taken to remove the unknown channel. By computing the differential within a frequency hop, within a PRG, or within an RB bundle the receiver can avoid calculating a differential on portions of the transmission that may have different channel conditions. As an example, at 1308, for a transmission with frequency hopping, the receiver may determine the differential based on:

$$D_\alpha y_i(x) = \begin{cases} Re(y_i^*(x) y_i(x \oplus \alpha)) & \text{if } x \text{ and } x \oplus \alpha \text{ are in the same frequency hop} \\ 0 & \text{if otherwise} \end{cases}.$$

As an example, at 1308, for a transmission with selective precoding, the receiver may determine the differential based on:

$$D_\alpha y_i(x) = \begin{cases} Re(y_i^*(x) y_i(x \oplus \alpha)) & \text{if } x \text{ and } x \oplus \alpha \text{ are in the same } PRG \\ 0 & \text{if otherwise} \end{cases}.$$

As an example, at 1308, for a transmission with distributed resource mapping, the receiver may determine the differential based on:

$$D_\alpha y_i(x) = \begin{cases} Re(y_i^*(x)y_i(x \oplus \alpha)) & \text{if } x \text{ and } x \oplus \alpha \text{ are in the same } RB \text{ bundle} \\ 0 & \text{if otherwise} \end{cases}$$

The may be performed for the first differential from order r to order r−1. For the second differential from order r−1 to r−2 and r−2 to r−3 etc., as the phases are already removed from the first differential, the receiver may not perform a differential per PRG/RB bundle/frequency hop and may instead compute the second differential (or additional differentials) across the whole signal. For example, an initial differential from the order r to the order r−1 may be determined within the single frequency hop, the single coherence block, the single PRG, or the single resource block bundle, and an additional differential from the order r−1 to an order r−2 may be determined across the received non-coherent signal.

Figure 14:
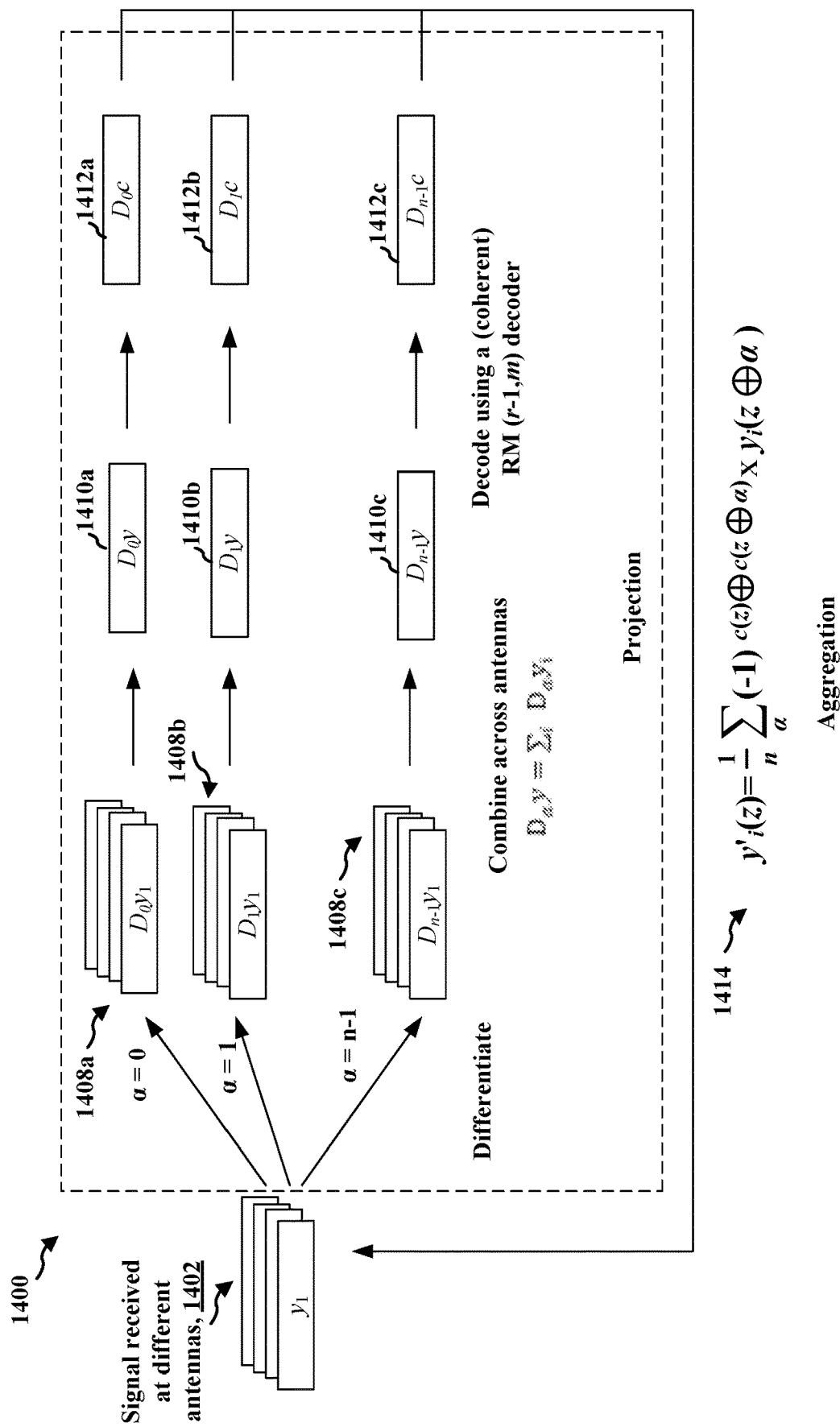
FIG. 14 illustrates example aspects of a noncoherent Reed Muller differential, aggregation, and reconstruction based decoder, in accordance with various aspects of the present disclosure.

FIG. 14 illustrates example aspects of a differential aggregation reconstruction decoder 1400. The aggregation may improve performance for non-coherent transmission decoding. FIG. 14 illustrates the signal 1402 received at different antennas, e.g., $y_1$, $y_2$, etc. As described in connection with FIG. 10, and as shown at 1408a, 1408b, and 1408c, the receiver may determine a differential of the received signal on each of the receive antennas and for binary vectors based on a set of directions, e.g., $\alpha$=0 to n−1. As illustrated at 1410a, 1410b, 1410c, the receiver combines the differentials across antennas to obtain $D_\alpha y$ for each of the directions $\alpha$=0 to n−1 and uses the differentials to decode the signal. The bits of a differential $D_\alpha c$, with the codeword being represented by c, indicate the pairwise XOR $c(x) \oplus c(x \oplus \alpha)$ between the bits of the original RM codeword c. The codeword, c(x), corresponds to 0 or 1, e.g., $c(x) \in \{0, 1\}$, and after modulation, such as BPSK or QPSK modulation, the modulated signal, e.g., u(x), is either −1 or 1, e.g., u(x) E {−1,1}. For example, $D_\alpha c$ provides an estimate about whether c(x) and $c(x \oplus \alpha)$ are the same or they are different. The estimation of $D_\alpha c$, e.g., 1412a, 1412b, 1412c, can be used to obtain a better understanding of c. FIG. 14 illustrates an example of aggregation at 1414. For example, such estimation can be used to aggregate/strengthen the received signals, and to enhance the signal-to-noise ratio at the receiver. As an example, if the differential indicates that two bits c(x) and $c(x \oplus \alpha)$ are the same, the receiver may use that information to combine the received signal corresponding to the two bits and apply an average at both bit locations, e.g., $(y(x)+y(x \oplus \alpha))/2$. Similarly, if the differential indicates that the bits are different, and will have different signs, the receiver may enhance y(x) to $(y(x)-y(x \oplus \alpha))/2$ and enhance $y(x \oplus \alpha)$ to $(y(x \oplus \alpha)-y(x))/2$. If a majority of the differentials are correctly decoded, the aggregated signal may have a higher SNR than the original channel output that is originally received. If the phase of the channel h stays constant/similar across y(x) and $y(x \oplus \alpha)$, then by taking $(y(x)+y(x \oplus \alpha))/2$, the signals are combined coherently (although the actual channel phase is not known at the receiver). The aggregation may be performed for each receive antenna separately. As the phases of the channel on different receive antennas may be different, the receiver may not combine the signals on different receive antennas coherently, without knowing what the different phases. The receiver is able to combine the signals received by the same receive antenna coherently, for example, if the receiver has an estimate of whether c(x) and $c(x \oplus \alpha)$ a) are the same or are different.

Figure 15:
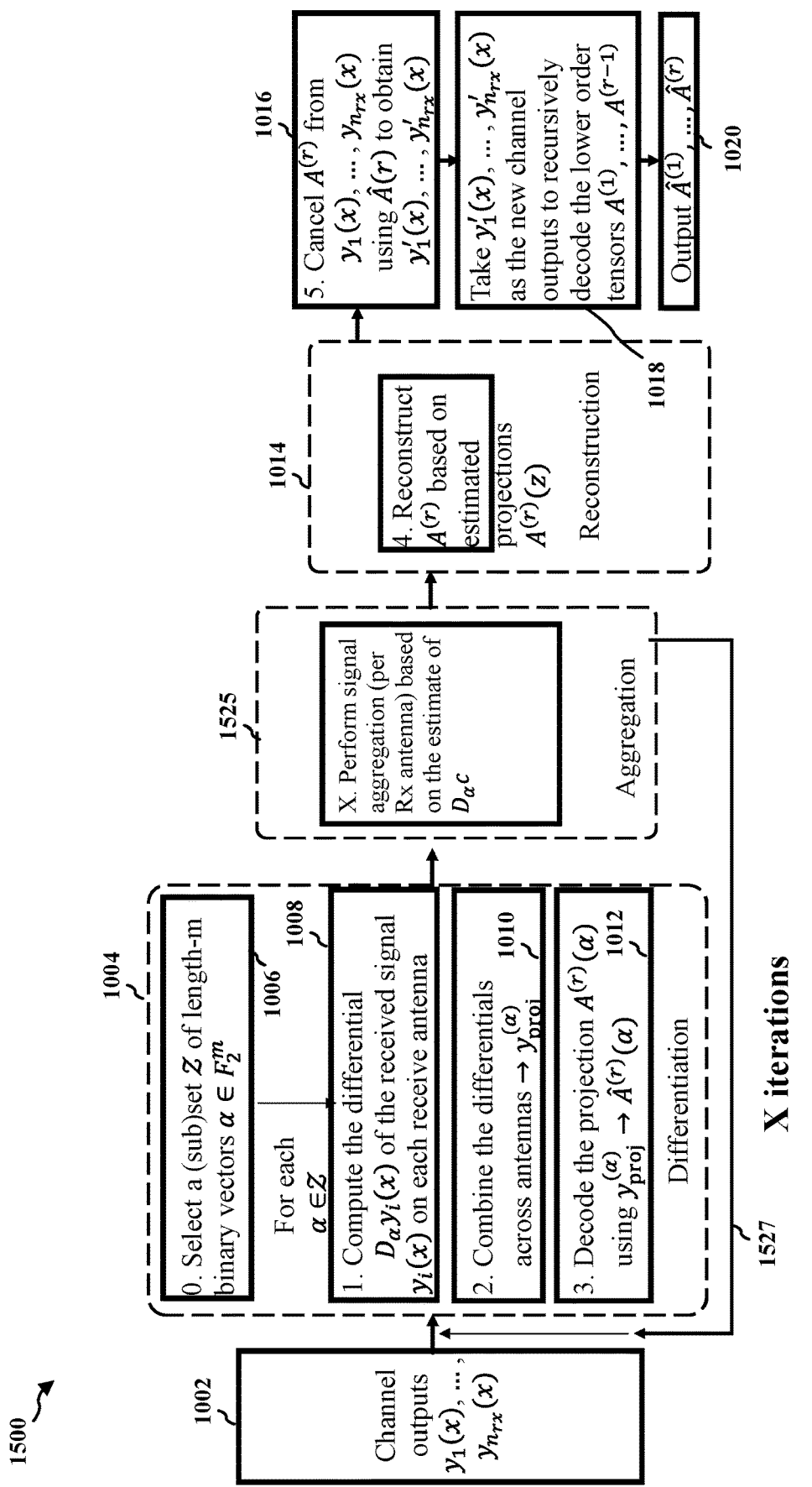
FIG. 15 illustrates example aspects of a noncoherent Reed Muller differential, aggregation, and reconstruction based decoder, in accordance with various aspects of the present disclosure.

FIG. 15 illustrates example aspects of a noncoherent Reed Muller decoder 1500 for decoding a signal with differential aggregation reconstruction. The aspects of FIG. 15 that are similar to FIG. 10 are shown with the same reference number. In FIG. 15, the aggregation, at 1525, is added to the decoder example in FIG. 10. At 1525, the receiver performs a signal aggregation (per receive antenna) based on the estimate of $D_\alpha c$, e.g., the differential between pairwise locations of the signal, such as described in connection with FIG. 14. The receiver may perform one or more iterations of the differential and aggregation, as shown at 1527 in FIG. 15.

Figure 16B:
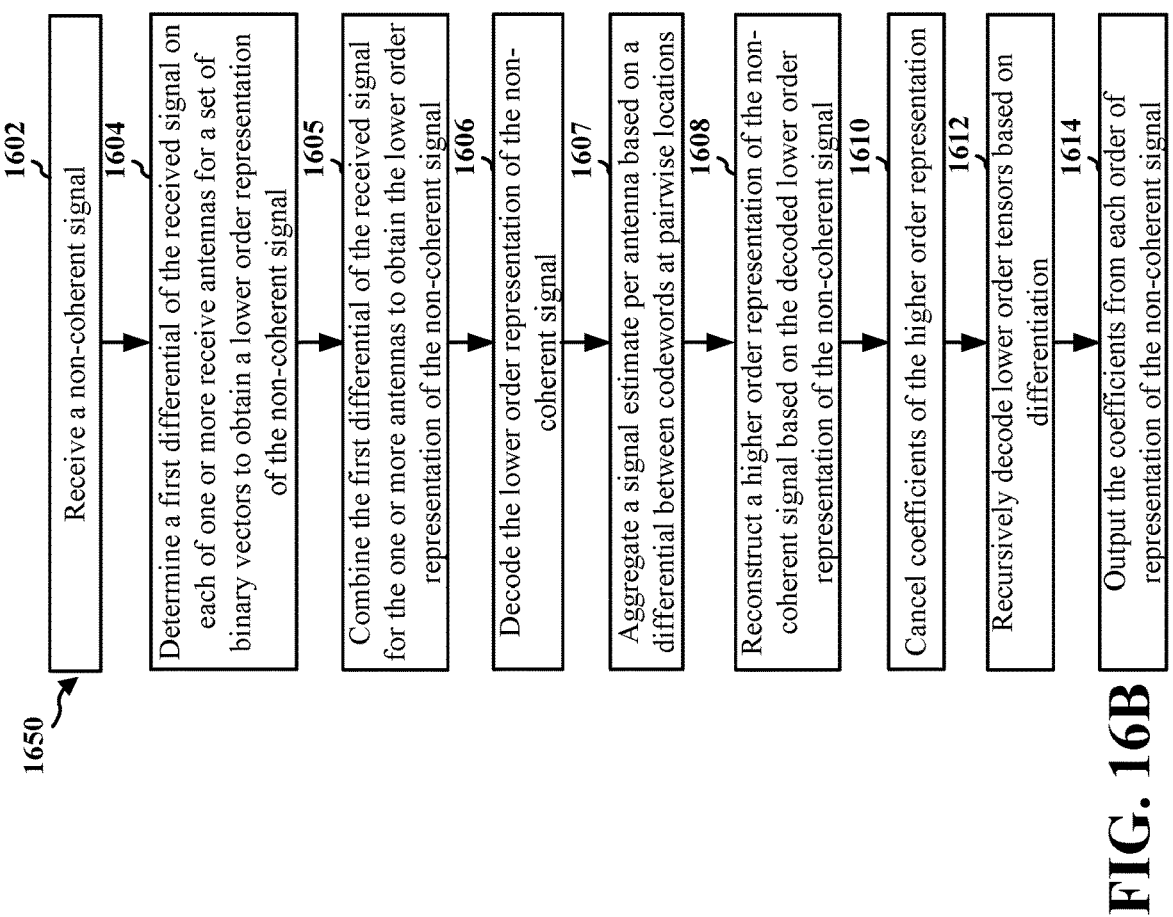
FIGS. 16A and 16B are flowcharts of methods of wireless communication, in accordance with various aspects of the present disclosure.
Figure 16A:
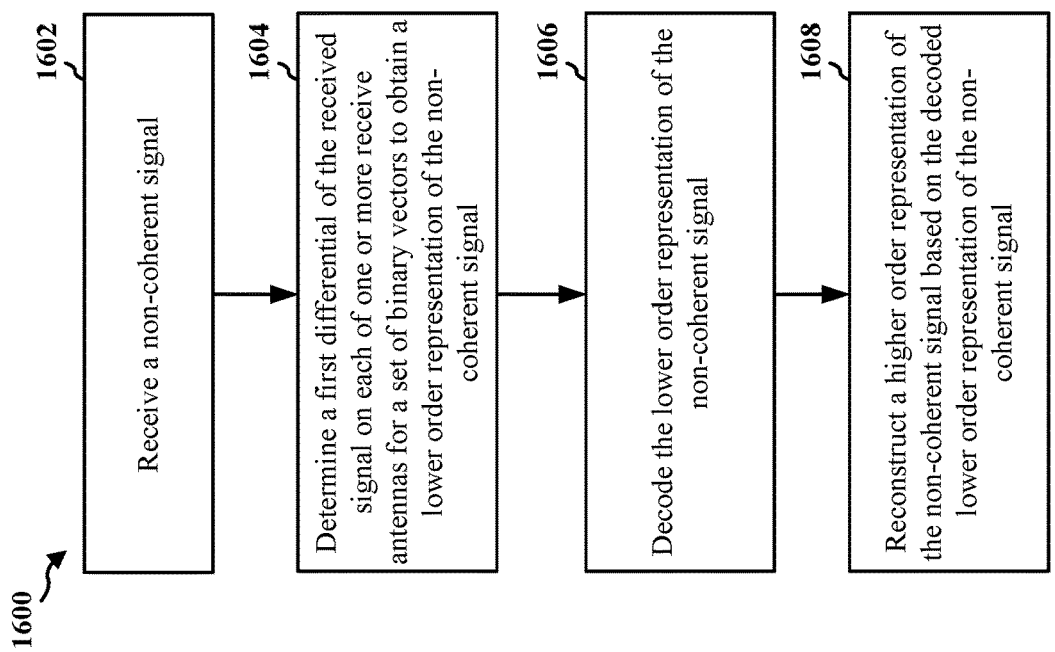

FIG. 16A is a flowchart 1600 of a method of wireless communication at a receiver. In some aspects, the method may be performed by a UE (e.g., the UE 104, 350, the decoder 1000, 1300, or 1500; the apparatus 1702). In some aspects, the method may be performed by a network node (e.g., a base station 102/180 or a component of the base station 102/180; IAB node 111; base station 310; the decoder 1000, 1300, or 1500; the apparatus 1702). The method may improve non-coherent communication by reducing complexity at a receiver to decode a non-coherent transmission. Improved reception of non-coherent communication may allow a transmitter to save energy and/or resources by transmitting the communication without a pilot signal or DMRS. Improved reception of noncoherent communication may improve the coverage of the communication/transmitted signal.

At 1602, the receiver receives a non-coherent signal. As an example, the non-coherent signal may be based on a Reed Muller code having an order r and a dimension m, such as described in connection with any of FIGS. 6-15. The reception may be performed, e.g., by the reception component 1730 of the apparatus 1702 in FIG. 17. The non-coherent signal may correspond to the channel outputs received at 1002 in FIG. 10, 13, or 15.

At 1604, the receiver determines a first differential of the received non-coherent signal on each of one or more receive antennas for a set of binary vectors to obtain a lower order representation of the non-coherent signal. Example aspects of differential calculation are described in connection with 1008 in FIGS. 10, 13, and 15, and are shown in FIG. 14. For example, the receiver may determine, or compute, the differential $D_\alpha y_i(x)$ of the received signal $y_i(x)$ on each receive antenna. The determination of the differential may be performed, e.g., by the differential component 1740 of the apparatus 1702. The non-coherent signal may be based on a Reed Muller code having an order r and a dimension m, and wherein determining the first differential may include determining one or more recursive differentials until obtaining a first order Reed Muller code. For a Reed Muller code having the order r, the lower order representation of the non-coherent signal comprises the Reed Muller code of order r−1. As an example, performing recursive differentials corresponds to differential to obtain r−1, r−2, and continuing until obtaining a first order Reed Muller code. In some aspects, the recursive differential may be represented as r->r-1->r-2. . . ->1st order Reed Muller code.

In some aspects, an initial differential from the order r to the order r−1 may be different than an additional differential from the order r−1 to an order r−2. The initial differential from the order r to the order r−1 may be performed across multiple antennas and the additional differential from the order r−1 to the order r−2 may be performed on a single antenna.

The set of binary vectors may have a length based on a dimension parameter of a code of the non-coherent signal.

Each of the binary vectors represents a direction in which the differential is taken. The set of binary vectors may be based on one or more of: a dimension parameter of a Reed Muller code, a vector weight, a vector length, or a random subset, e.g., as described in connection with 1006 in FIG. 10. In some aspects, the subset may be a subset of vectors whose span is a space of all binary vectors associated with the dimensional parameter. The receiver may select a reduced set of directions in order to reduce the complexity at the receiver, and may select directions that provide information in order to reconstruct the signal. As an example, for an m-by-m vector P, such as shown at 802 in FIG. 8, the directional vectors may correspond to an m-by-1 first order vector, such as illustrated by 801. The vector P, may be reconstructed based on m first order vectors, e.g., $P_{\alpha 1}$, $P_{\alpha 2}, \ldots, P_{\alpha m}$. The direction, a may be a non-zero number. In some aspects, the subset $\mathcal{Z}$ may be based on $\mathcal{Z} = \{e_1, \ldots, e_m\}$, where $e_1(k)=1$ for k=i and $e_1(k)=0$. The aspect may provide a set of m vectors. In other words, the set Z form the standard basis of the binary field $F_2^m$. In some aspects, the subset $\mathcal{Z}$ may be based on binary vectors having a particular weight, such as $\mathcal{Z}$=binary vectors of weight ≤2 or binary vectors of weight <=m/2. In such aspects, the number of vectors in the subset is based on m and the weight. In some aspects, the subset may be a random subset, e.g., $\mathcal{Z} \subset F_2^m$. In some aspects, the subset may be based on binary vectors of a particular length, such as all length m binary vectors. The subset may be represented as $\mathcal{Z} = F_2^m$, which will include a set of $2^m$ vectors. In some aspects, the first differential may be determined for a portion the received non-coherent signal that is within at least one of: a single frequency hop; a single coherence block, a single PRG, or a single RB bundle, e.g., as described in connection with FIG. 12 or 13. In some aspects, an initial differential from the order r to the order r−1 may be determined within the single frequency hop, the single coherence block, the single PRG, or the single resource block bundle, and an additional differential from the order r−1 to an order r−2 may be determined across the received non-coherent signal.

At 1606, the receiver decodes the lower order representation of the non-coherent signal based on the first differential of the non-coherent signal. Example aspects of decoding a lower order representation of the non-coherent signal are described in connection with 1012 in in FIGS. 10, 13, and 15. The decoding may be performed, e.g., by the decoder component 1742 of the apparatus 1702. In some aspects, the receiver may decode the lower order representation of the non-coherent signal by decoding the first order Reed Muller code based on an FHT. For example, the receiver may identify the lower order representation of the non-coherent signal that corresponds to a first order Reed Muller code and decode the first order Reed Muller code based on FHT.

At 1608, the receiver reconstructs a higher order representation of the non-coherent signal based on the decoded lower order representation of the non-coherent signal. Each binary vector in the set of binary vectors corresponds to a single lower order representation of the non-coherent signal, and reconstructing the higher order representation of the non-coherent signal includes reconstructing the non-coherent signal based on a set of lower order representations corresponding to the set of binary vectors. For example, more than one lower order representation (e.g., lower order Reed Muller codes) are used to reconstruct the higher order representation. When a differential is taken for a function, information is lost about the higher-order coefficients. Therefore, multiple differential (e.g., differentials taken multiple times), along multiple directions (represented by the set of binary vectors) are used to recover the information contained in the higher order objects. Example aspects of reconstruction are described in connection with 1014 in in FIGS. 10, 13, and 15. The reconstruction may be performed, e.g., by the reconstruction component 1744 of the apparatus 1702.

FIG. 16B is a flowchart 1650 of a method of wireless communication at a receiver. In some aspects, the method may be performed by a UE (e.g., the UE 104, 350, the decoder 1000, 1300, or 1500; the apparatus 1702). In some aspects, the method may be performed by a network node (e.g., a base station 102/180 or a component of the base station 102/180; IAB node 111; base station 310; the decoder 1000, 1300, or 1500; the apparatus 1702). The method may improve non-coherent communication by reducing complexity at a receiver to decode a non-coherent transmission and may further include performance of the non-coherent decoding. Improved reception of non-coherent communication may allow a transmitter to save energy and/or resources by transmitting the communication without a pilot signal or DMRS.

The method may include 1602, 1604, 1606, and/or 1608, as described in connection with FIG. 16A. In some aspects, to determine the first differential of the received non-coherent signal on each of the multiple receive antennas, the receiver may combine a complex conjugate of the received non-coherent signal with the received non-coherent signal per antenna to cancel a channel phase before combining the first differential across the multiple receive antennas. As an example, combining the complex conjugate of the received non-coherent signal with the received non-coherent signal may multiplying the complex conjugate of the received non-coherent signal with the received non-coherent signal and taking a real portion of a complex signal based on the multiplied complex conjugate and the received non-coherent signal. For example, a per antenna projection may be based on, $D_z y_i(x) = \text{Re}(y_i^*(x) y_i(x \oplus \alpha)) = |h_i|^2 (-1)^{c(x) \oplus c(x \oplus z)} + \text{noise}$, where $\{c(x) \oplus c(x \oplus \alpha)\}_x$ is an (r−1)-th order RM code whose (r−1) degree terms correspond to the information bits given by the (r−1) dimensional square tensor $A^{(r-1)}(z)$.

As illustrated at 1605, the receiver may further combine the first differential of the received non-coherent signal for the multiple receive antennas to obtain the lower order representation of the non-coherent signal. For example, the receiver may sum the differential $D_\alpha y_i(x)$ element wise across each of the receive antennas $y_{proj}$, e.g., as described in connection with 1010 in FIG. 10, 13, or 15. The combination may be performed, e.g., by the combination component 1750 of the apparatus 1702.

As illustrated at 1607, the receiver may aggregate a signal estimate on each of the one or more receive antennas (e.g. per antenna) based on a differential between codewords at pairwise locations. The receiver may perform multiple iterations of obtaining a differential and signal aggregation for each of the one or more receive antennas (e.g., per antenna) based on the differential at the pairwise locations. For example, the receiver may determine a first differential of the received non-coherent signal and perform a first aggregation, determine a second differential and perform a second aggregation, determine a third differential and perform a third aggregation as a part of the multiple iterations. Although an example of three iterations is provided, the aspects presented herein may be applied for any of two or more iterations. The aggregation may improve performance of the non-coherent decoding, e.g., as described in connection with FIGS. 14 and 15. The aggregation may be performed, e.g., by the aggregation component 1752 of the apparatus 1702.

As illustrated at 1610, the receiver may cancel coefficients of the higher order representation from the non-coherent signal. The cancelation may be performed by the cancelation component 1746 of the apparatus 1702. Example aspects of cancelation are described in connection with 1016 in FIGS. 10, 13, and 15. For example, after the reconstruction of the coefficients for the higher order, e.g., highest order, polynomial representation of the received signal, the receiver cancels $A^{(r)}$ from the channel output on each receive antenna received as $y_1(x), \ldots, y_{n_{rx}}(x)$ using $\hat{A}(r)$ to obtain $y'_1(x), \ldots, y'_{r_{rx}}(x)$. The receiver obtains a polynomial term of a Reed Muller code of a lower degree.

As illustrated at 1612, the receiver may recursively decode lower order tensors based on differentiation. The decoding may be performed by the decoder component 1742 of the apparatus 1702. As an example, as described in connection with 1018, the receiver may take $y'_1(x), \ldots, y_{n_{rx}}(x)$ as the new channel outputs, e.g., at 1002, to recursively decode the lower order tensors $A^{(1)}, \ldots, A^{(r-1)}$. For example, after decoding $A^{(r)}$, the receiver may cancel the contribution from $A^{(r)}$ on each receive antenna $y'_i(x)=y_i(x)\times (-1)^{C_{0,0},\ldots,A(r)^{(x)}}$; and may then take $y'_i(x)$ as the new channel output, e.g., at 1002, to decode the lower order tensors $A^{(r-1)}$ and then $A^{(r-2)}$.

As illustrated at 1614, the receiver may output the coefficients from each order of representation of the non-coherent signal. The output may be performed by the coefficient component 1748 of the apparatus 1702. Example aspects of such output are described in connection with 1020 in FIGS. 10, 13, and 15. The receiver may decode the coefficient of each of the orders of the Reed Muller code in order to recover the coefficient terms for the received signal. For example, the receiver may output $\hat{A}^{(1)}, \ldots, \hat{A}^{(r)}$.

Figure 17:
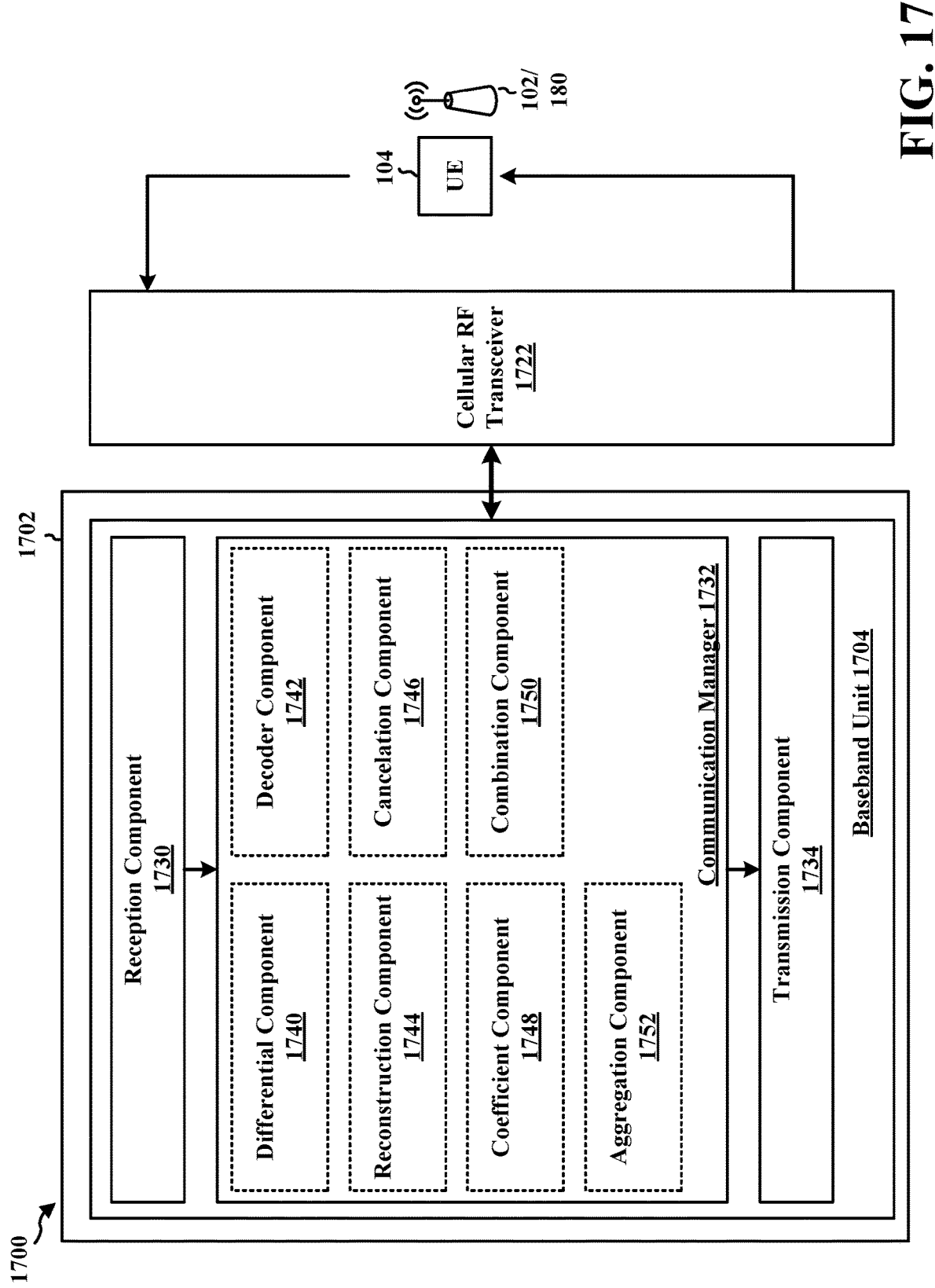
FIG. 17 is a diagram illustrating an example of a hardware implementation for an example apparatus, in accordance with various aspects of the present disclosure.

FIG. 17 is a diagram 1700 illustrating an example of a hardware implementation for an apparatus 1702. The apparatus 1702 may be a UE, a component of a UE, or may implement UE functionality. The apparatus 1702 may be a network node. The apparatus 1702 may be a base station, a component of a base station, or may implement base station functionality. In some aspects, the apparatus 1702 may include a baseband unit 1704 and/or a cellular RF transceiver 1722. In some aspects, the apparatus 1702 may include one or more antennas. The baseband unit 1704 may communicate through a cellular RF transceiver 1722 with the UE 104, the base station 102/180, or an IAB node 111, among other examples. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 or the UE 350 and may include the memory 360 or 376 and/or at least one of the TX processor 316 or 368, the RX processor 356 or 370, and the controller/processor 359 or 375.

The communication manager 1732 includes a reception component 1730 that is configured to receive a non-coherent signal, e.g., as described in connection with 1602 in FIG. 16A and/or 16B. The communication manager 1732 includes a differential component 1740 that is configured to determine a first differential of the received non-coherent signal on each of one or more receive antennas for a set of binary vectors to obtain a lower order representation of the non-coherent signal, e.g., as described in connection with 1604 in FIG. 16A and/or 16B. The communication manager 1732 further includes a decoder component 1742 that is configured to decode the lower order representation of the non-coherent signal based on the first differential of the received non-coherent signal, e.g., as described in connection with 1606 in FIG. 16A and/or 16B. The communication manager 1732 further includes a reconstruction component 1744 that is configured to reconstruct a higher order representation of the non-coherent signal based on the decoded lower order representation of the non-coherent signal, e.g., as described in connection with 1608 in FIG. 16A and/or 16B. The communication manager 1732 may further include a cancelation component 1746 that is configured to cancel coefficients of the higher order representation from the non-coherent signal, e.g., as described in connection with 1610 in FIG. 16B. The communication manager 1732 may further include a coefficient component 1748 that is configured to output the coefficients from each order of representation of the non-coherent signal, e.g., as described in connection with 1614 in FIG. 16B. The communication manager 1732 may further include a combination component 1750 that is configured to combine the differentials across antennas, e.g., as described in connection with 1605 in FIG. 16B. The communication manager 1732 may include a decoder component 1742 that is configured to recursively decode lower order tensors based on differentiation, e.g., as described in connection with 1612 in FIG. 16B. The communication manager 1732 may further include an aggregation component 1752 that is configured to aggregate a signal estimate one each of the one or more antennas based on a differential between codewords at pairwise locations, e.g., as described in connection with 1607 in FIG. 16B. The aggregation component 1752 and the differential component 1740 may be configured to perform multiple iterations of obtaining a differential and signal aggregation for each of the one or more receive antennas based on the differential at the pairwise locations.

The apparatus may include additional components that perform each of the blocks of the algorithm in the flowcharts of FIGS. 16A, 16B, or performed by the decoder in FIG. 10, 11, 13, 14, or 15. As such, each block in the flowcharts of FIGS. 16A, 16B, or performed by the decoder in FIG. 10, 11, 13, 14, or 15*may* be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for receiving a non-coherent signal; means for determining a first differential of the received non-coherent signal on each of one or more receive antennas for a set of binary vectors to obtain a lower order representation of the non-coherent signal; means for decoding the lower order representation of the non-coherent signal based on the first differential of the received non-coherent signal; and means for reconstructing a higher order representation of the non-coherent signal based on the decoded lower order representation of the non-coherent signal. The apparatus 1702 may include means for combining a complex conjugate of the received non-coherent signal with the received non-coherent signal per antenna to cancel a channel phase before combining the first differential across multiple receive antennas. The apparatus 1702 may include means for combining the first differential of the received non-coherent signal for the multiple receive antennas to obtain the lower order representation of the non-coherent signal. The apparatus 1702 may include means for canceling coefficients of the higher order representation from the non-coherent signal; means for recursively decoding lower order tensors based on differentiation; and means for outputting the coefficients from each order of representation of the non-coherent signal. The apparatus 1702 may include means for aggregating a signal estimate on each of the one or more receive antennas based on a differential between codewords at pairwise locations. The apparatus 1702 may include means for performing multiple iterations of signal aggregation on each of the one or more receive antennas based on the differential at the pairwise locations. The means may be one or more of the components of the apparatus 1702 configured to perform the functions recited by the means. As described supra, the apparatus 1702 may include the TX Processor 316 or 368, the RX Processor 356 or 370, and the controller/processor 359 or 375. As such, in one configuration, the means may be the TX Processor 316 or 368, the RX Processor 356 or 370, and/or the controller/processor 359 or 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is method of wireless communication at a receiver, comprising: receiving a non-coherent signal; determining a first differential of the received non-coherent signal on each of one or more receive antennas for a set of binary vectors to obtain a lower order representation of the non-coherent signal; decoding the lower order representation of the non-coherent signal based on the first differential of the received non-coherent signal; and reconstructing a higher order representation of the non-coherent signal based on the decoded lower order representation of the non-coherent signal.

In aspect 2, the method of aspect 1 further includes that each binary vector in the set of binary vectors corresponds to a single lower order representation of the non-coherent signal, wherein reconstructing the higher order representation of the non-coherent signal comprises reconstructing the non-coherent signal based on a set of lower order representations corresponding to the set of binary vectors.

In aspect 3, the method of aspect 1 or aspect 2 further includes that the non-coherent signal is based on a Reed Muller code having an order r and a dimension m, and wherein determining the first differential includes determining one or more recursive differentials until obtaining a first order Reed Muller code.

In aspect 4, the method of aspect 3 further includes that for the Reed Muller code having the order r, the lower order representation of the non-coherent signal comprises the Reed Muller code of order r–1.

In aspect 5, the method of aspect 3 or aspect 4 further includes that an initial differential from the order r to the order r–1 is different than an additional differential from the order r–1 to an order r–2.

In aspect 6, the method of any of aspects 3-5 further includes that the initial differential from the order r to the order r–1 is performed across multiple antennas and the additional differential from the order r–1 to the order r–2 is performed on a single antenna.

In aspect 7, the method of any of aspects 3-6 further includes decoding the lower order representation of the non-coherent signal includes decoding the first order Reed Muller code based on an FHT.

In aspect 8, the method of any of aspects 1-7 further includes identifying the lower order representation of the non-coherent signal that corresponds to a first order Reed Muller code, wherein decoding the lower order representation includes decoding the first order Reed Muller code based on an FHT.

In aspect 9, the method of any of aspects 1-8 further includes that the set of binary vectors have a length based on a dimension parameter of a code of the non-coherent signal.

In aspect 10, the method of any of aspects 1-9 further includes that the set of binary vectors is based on one or more of: a dimension parameter of a Reed Muller code, a vector weight, a vector length, or a subset of vectors whose span is a space of all binary vectors associated with the dimensional parameter.

In aspect 11, the method of any of aspects 1-10 further includes that determining the first differential of the received non-coherent signal on each of the one or more receive antennas includes combining a complex conjugate of the received non-coherent signal with the received non-coherent signal per antenna to cancel a channel phase before combining the first differential across multiple receive antennas.

In aspect 12, the method of aspect 11 further includes combining the complex conjugate of the received non-coherent signal with the received non-coherent signal includes: multiplying the complex conjugate of the received non-coherent signal with the received non-coherent signal; and taking a real portion of a complex signal based on the multiplied complex conjugate and the received non-coherent signal.

In aspect 13, the method of any of aspects 1-12 further includes combining the first differential of the received non-coherent signal for multiple receive antennas to obtain the lower order representation of the non-coherent signal.

In aspect 14, the method of any of aspects 1-13 further includes canceling coefficients of the higher order representation from the non-coherent signal; recursively decoding lower order tensors based on differentiation; and outputting the coefficients from each order of representation of the non-coherent signal.

In aspect 15, the method of any of aspects 1-14 further includes that the first differential is determined for a portion the received non-coherent signal that is within at least one of: a single frequency hop; a single coherence block, a single PRG, or a single resource block bundle.

In aspect 16, the method of aspect 15 further includes that an initial differential from the order r to the order r−1 is determined within the single frequency hop, the single coherence block, the single PRG, or the single resource block bundle, and an additional differential from the order r−1 to an order r−2 is determined across the received non-coherent signal.

In aspect 17, the method of any of aspects 1-16 further includes aggregating a signal estimate on each of the one or more receive antennas based on a differential between codewords at pairwise locations.

In aspect 18, the method of aspect 17 further includes performing multiple iterations of obtaining a differential and signal aggregation for each of the one or more receive antennas based on the differential at the pairwise locations.

Aspect 19 is an apparatus for wireless communication including memory and at least one processor coupled to the memory and configured to implement any of aspects 1 to 18.

In aspect 20, the apparatus of aspect 19 further includes a transceiver coupled to the at least one processor.

In aspect 21, the apparatus of aspect 19 or 20 further includes at least one antenna coupled to the at least one processor.

Aspect 22 is an apparatus for wireless communication including means for implementing any of aspects 1 to 18.

In aspect 23, the apparatus of aspect 22 further includes a transceiver.

In aspect 24, the apparatus of aspect 22 or 23 further includes at least one antenna.

Aspect 25 is a non-transitory computer-readable medium storing computer executable code, where the code when executed by a processor causes the processor to implement any of aspects 1 to 18.

What is claimed is:

1. A method of wireless communication at a receiver, comprising:
    receiving a non-coherent signal;
    determining a first differential of the received non-coherent signal on each of one or more receive antennas for a set of binary vectors to obtain a lower order representation of the non-coherent signal;
    decoding the lower order representation of the non-coherent signal based on the first differential of the received non-coherent signal; and
    reconstructing a higher order representation of the non-coherent signal based on the decoded lower order representation of the non-coherent signal.

2. The method of claim 1, wherein each binary vector in the set of binary vectors corresponds to a single lower order representation of the non-coherent signal, wherein reconstructing the higher order representation of the non-coherent signal comprises reconstructing the non-coherent signal based on a set of lower order representations corresponding to the set of binary vectors.

3. The method of claim 1, wherein the non-coherent signal is based on a Reed Muller code having an order r and a dimension m, and wherein determining the first differential includes determining one or more recursive differentials until obtaining a first order Reed Muller code, and wherein for the Reed Muller code having the order r, the lower order representation of the non-coherent signal comprises the Reed Muller code of order r−1.

4. The method of claim 3, wherein decoding the lower order representation of the non-coherent signal includes decoding the first order Reed Muller code based on a fast hadamard transform (FHT).

5. The method of claim 1, further comprising:
    identifying the lower order representation of the non-coherent signal that corresponds to a first order Reed Muller code, wherein decoding the lower order representation includes decoding the first order Reed Muller code based on a fast hadamard transform (FHT).

6. The method of claim 1, wherein the set of binary vectors have a length based on a dimension parameter of a code of the non-coherent signal, or wherein the set of binary vectors is based on one or more of:
    the dimension parameter of a Reed Muller code,
    a vector weight,
    a vector length, or
    a subset of vectors whose span is a space of all binary vectors associated with the dimension parameter.

7. The method of claim 1, wherein determining the first differential of the received non-coherent signal on each of the one or more receive antennas includes combining a complex conjugate of the received non-coherent signal with the received non-coherent signal per antenna to cancel a channel phase before combining the first differential across multiple receive antennas, and wherein combining the complex conjugate of the received non-coherent signal with the received non-coherent signal includes:

multiplying the complex conjugate of the received non-coherent signal with the received non-coherent signal; and taking a real portion of a complex signal based on the multiplied complex conjugate and the received non-coherent signal.

8. The method of claim 1, further comprising:
combining the first differential of the received non-coherent signal for multiple receive antennas to obtain the lower order representation of the non-coherent signal.

9. The method of claim 1, further comprising:
canceling coefficients of the higher order representation from the non-coherent signal;
recursively decoding lower order tensors based on differentiation; and
outputting the coefficients from each order of representation of the non-coherent signal.

10. The method of claim 1, wherein the first differential is determined for a portion the received non-coherent signal that is within at least one of:
a single frequency hop;
a single coherence block,
a single precoding resource block (PRG), or
a single resource block bundle.

11. The method of claim 1, further comprising:
aggregating a signal estimate on each of the one or more receive antennas based on a differential between codewords at pairwise locations; and
performing multiple iterations of obtaining a differential and signal aggregation for each of the one or more receive antennas based on the differential at the pairwise locations.

12. An apparatus for wireless communication at a receiver, comprising:
memory; and
at least one processor coupled to the memory and configured to:
receive a non-coherent signal;
determine a first differential of the received non-coherent signal on each of one or more receive antennas for a set of binary vectors to obtain a lower order representation of the non-coherent signal;
decode the lower order representation of the non-coherent signal based on the first differential of the received non-coherent signal; and
reconstruct a higher order representation of the non-coherent signal based on the decoded lower order representation of the non-coherent signal.

13. The apparatus of claim 12, further comprising:
at least one transceiver coupled to the at least one processor, wherein each binary vector in the set of binary vectors corresponds to a single lower order representation of the non-coherent signal, wherein to reconstruct the higher order representation of the non-coherent signal, the at least one processor is configured to reconstruct the non-coherent signal based on a set of lower order representations corresponding to the set of binary vectors.

14. The apparatus of claim 12, wherein the non-coherent signal is based on a Reed Muller code having an order r and a dimension m, and wherein to determine the first differential, the at least one processor is configured to determine one or more recursive differentials until obtaining a first order Reed Muller code, and wherein for the Reed Muller code having the order r, the lower order representation of the non-coherent signal comprises the Reed Muller code of order r−1.

15. The apparatus of claim 14, wherein an initial differential from the order r to the order r−1 is different than an additional differential from the order r−1 to an order r−2.

16. The apparatus of claim 15, wherein the initial differential from the order r to the order r−1 is performed across multiple antennas and the additional differential from the order r−1 to the order r−2 is performed on a single antenna.

17. The apparatus of claim 14, wherein to decode the lower order representation of the non-coherent signal, the at least one processor is configured to decode the first order Reed Muller code based on a fast hadamard transform (FHT).

18. The apparatus of claim 12, wherein the at least one processor is further configured to:
identify the lower order representation of the non-coherent signal that corresponds to a first order Reed Muller code; and
decode the first order Reed Muller code based on a fast hadamard transform (FHT).

19. The apparatus of claim 12, wherein the set of binary vectors have a length based on a dimension parameter of a code of the non-coherent signal.

20. The apparatus of claim 12, wherein the set of binary vectors is based on one or more of:
a dimension parameter of a Reed Muller code,
a vector weight,
a vector length, or
a subset of vectors whose span is a space of all binary vectors associated with the dimension parameter.

21. The apparatus of claim 12, wherein to determine the first differential of the received non-coherent signal on each of the one or more receive antennas, the at least one processor is configured to combine a complex conjugate of the received non-coherent signal with the received non-coherent signal per antenna to cancel a channel phase before combining the first differential across multiple receive antennas.

22. The apparatus of claim 21, wherein to combine the complex conjugate of the received non-coherent signal with the received non-coherent signal, the at least one processor is configured to:
multiply the complex conjugate of the received non-coherent signal with the received non-coherent signal; and
take a real portion of a complex signal based on the multiplied complex conjugate and the received non-coherent signal.

23. The apparatus of claim 12, wherein the at least one processor is further configured to:
combine the first differential of the received non-coherent signal for multiple receive antennas to obtain the lower order representation of the non-coherent signal.

24. The apparatus of claim 12, wherein the at least one processor is further configured to:
cancel coefficients of the higher order representation from the non-coherent signal;
recursively decode lower order tensors based on differentiation; and
output the coefficients from each order of representation of the non-coherent signal.

25. The apparatus of claim 12, wherein the at least one processor is configured to determine the first differential for a portion the received non-coherent signal that is within at least one of:
- a single frequency hop;
- a single coherence block,
- a single precoding resource block (PRG), or
- a single resource block bundle.

26. The apparatus of claim 25, wherein an initial differential from an order r to an order r−1 is determined within the single frequency hop, the single coherence block, the single PRG, or the single resource block bundle, and an additional differential from the order r−1 to an order r−2 is determined across the received non-coherent signal.

27. The apparatus of claim 12, wherein the at least one processor is further configured to:
- aggregate a signal estimate on each of the one or more receive antennas based on a differential between codewords at pairwise locations.

28. The apparatus of claim 27, wherein the at least one processor is further configured to:
- perform multiple iterations of obtaining a differential and signal aggregation for each of the one or more receive antennas based on the differential at the pairwise locations.

29. An apparatus for wireless communication at a receiver, comprising:
- means for receiving a non-coherent signal;
- means for determining a first differential of the received non-coherent signal on each of one or more receive antennas for a set of binary vectors to obtain a lower order representation of the non-coherent signal;
- means for decoding the lower order representation of the non-coherent signal based on the first differential of the received non-coherent signal; and
- means for reconstructing a higher order representation of the non-coherent signal based on the decoded lower order representation of the non-coherent signal.

30. A non-transitory computer-readable medium storing computer executable code for wireless communication, the code when executed by a processor causes the processor to:
- receive a non-coherent signal;
- determine a first differential of the received non-coherent signal on each of one or more receive antennas for a set of binary vectors to obtain a lower order representation of the non-coherent signal;
- decode the lower order representation of the non-coherent signal based on the first differential of the received non-coherent signal; and
- reconstruct a higher order representation of the non-coherent signal based on the decoded lower order representation of the non-coherent signal.

* * * * *